(12) United States Patent
Bhogle et al.

(10) Patent No.: US 11,640,369 B2
(45) Date of Patent: May 2, 2023

(54) CROSS-PLATFORM COMMUNICATION FOR FACILITATION OF DATA SHARING

(71) Applicant: ServiceNow, Inc., Santa Clara, CA (US)

(72) Inventors: Deepti Bhogle, San Diego, CA (US); Joshua Timothy Nerius, Chicago, IL (US); Pierce Edward Courtney, San Diego, CA (US); Denis George Angleton, La Mesa, CA (US); Jacob Samuel Burman, Carlsbad, CA (US)

(73) Assignee: ServiceNow, Inc., Santa Clara, CA (US)

( * ) Notice: Subject to any disclaimer, the term of this patent is extended or adjusted under 35 U.S.C. 154(b) by 165 days.

(21) Appl. No.: 17/383,763

(22) Filed: Jul. 23, 2021

(65) Prior Publication Data
US 2022/0358083 A1 Nov. 10, 2022

Related U.S. Application Data

(60) Provisional application No. 63/184,307, filed on May 5, 2021.

(51) Int. Cl.
*G06F 16/182* (2019.01)
*G06F 16/11* (2019.01)
*G06F 18/2113* (2023.01)

(52) U.S. Cl.
CPC .......... *G06F 16/116* (2019.01); *G06F 16/182* (2019.01); *G06F 18/2113* (2023.01)

(58) Field of Classification Search
CPC .. G06F 16/116; G06F 16/182; G06F 18/2113; G06F 16/258; G06F 16/27; G06F 18/24
(Continued)

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

*Primary Examiner* — Hicham Skhoun
(74) *Attorney, Agent, or Firm* — McDonnell Boehnen Hulbert & Berghoff LLP

(57) ABSTRACT

Persistent storage may contain: (i) a database table containing entries, (ii) a definition of a communication endpoint of a remote system, and (iii) outbound flow processing. One or more processors may be configured to: detect a state change associated with a local entry in the database table; read, from the database table, a set of data representing the local entry; transform, using the outbound flow processing, the set of data into a format receivable by the remote system; create, for the set of data, a correlation record that contains a local correlation identifier, wherein the correlation record specifies the local entry; transmit, to the remote system, the set of data as transformed and the local correlation identifier; receive, from the remote system and for the set of data, a remote correlation identifier; add, to the correlation record, the remote correlation identifier; and write, to a correlation table, the correlation record.

20 Claims, 17 Drawing Sheets

(58) Field of Classification Search
USPC .................................................... 707/756
See application file for complete search history.

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,370,272 B2 | 2/2013 | Wickel |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,481,918 B1* | 11/2019 | Kumar ............... G06F 9/5038 |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 10,956,246 B1* | 3/2021 | Bagde ............... G06F 11/076 |
| 11,025,481 B1* | 6/2021 | Louca ............... H04L 41/069 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088075 A1 | 4/2009 | Baier et al. |
| 2009/0228984 A1 | 9/2009 | Sterin |
| 2010/0110932 A1 | 5/2010 | Doran et al. |
| 2014/0082077 A1* | 3/2014 | Hoshino ............... H04L 65/403 709/204 |
| 2015/0029860 A1* | 1/2015 | Narasimhan ........... H04L 47/50 370/235 |
| 2018/0123940 A1 | 5/2018 | Rimar et al. |
| 2019/0073257 A1* | 3/2019 | Dasgupta ............. G06F 16/258 |
| 2019/0104398 A1 | 4/2019 | Owen et al. |
| 2020/0050689 A1 | 2/2020 | Tal et al. |
| 2020/0050966 A1* | 2/2020 | Enuka ................. G06F 17/18 |
| 2020/0068028 A1* | 2/2020 | Gurtin ................. H04L 67/561 |
| 2020/0204443 A1 | 6/2020 | Bar Oz et al. |
| 2020/0301678 A1* | 9/2020 | Burman ................. G06F 9/541 |
| 2020/0410418 A1* | 12/2020 | Martynov .......... G06F 11/1461 |
| 2021/0360742 A1* | 11/2021 | Liao ..................... H04W 88/04 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner

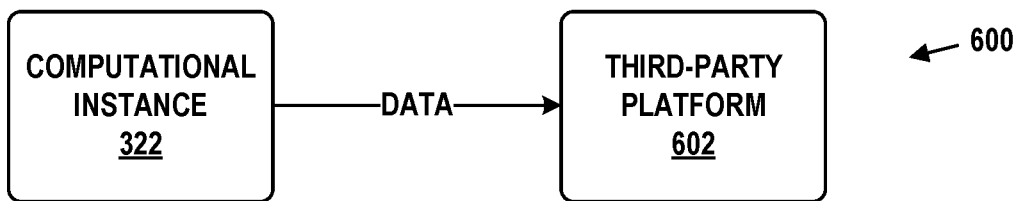
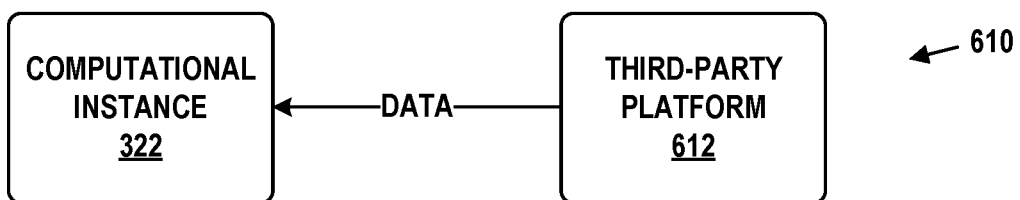
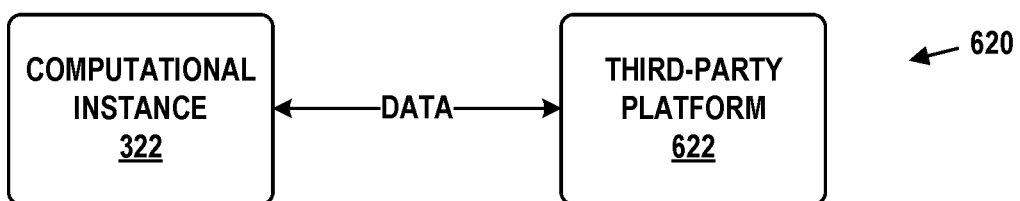
FIG. 6

CROSS-PLATFORM COMMUNICATION FOR FACILITATION OF DATA SHARING

CROSS-REFERENCE TO RELATED APPLICATION

This application claims priority to U.S. provisional patent application No. 63/184,307, filed May 5, 2021, which is hereby incorporated by reference in its entirety.

BACKGROUND

As the usage of cloud-based, multi-application platforms continues to grow, so does the impetus to share data of various types across these platforms. For example, an enterprise may use a remote network management platform to host a number of software applications that facilitate enterprise operations. Some of these applications, however, can benefit from being integrated with third-party providers of specialized solutions. These third-party solutions may be hosted in different cloud-based platforms.

Thus, a challenge when carrying out such integrations is to be able synchronize the data used by these applications between the remote network management platform and one or more other cloud-based platforms where each of these platforms may use different internal representations of this data. Currently, such integrations are customized point solutions developed on an ad-hoc basis. As a consequence, these conventional solutions struggle with inter-platform communication, data representation, and data correctness problems. Further, solutions developed for an application used by one pair of platforms cannot be easily leveraged or repurposed for other applications on a further pair of platforms.

SUMMARY

The embodiments herein address these and potentially other technical problems by providing a comprehensive software infrastructure for inter-platform communication. In particular, when it is desirable for an application on a remote network management platform to transmit data to another platform, procedures can be put in place on the remote network management platform to identify the application, one or more triggers that cause the transmission, the data to transmit (e.g., entries in a database table), and the interface on the other platform that can receive the data. When the trigger(s) occur, the remote network management platform queues the identified data for transmission and then transmits it by way of the interface. Likewise, when it is desirable for an application on the remote network management platform to receive data from another platform, procedures can be put in place on the remote network management platform to receive the data into a queue, identify the application from the queued data, and store the received data in an appropriate location (e.g., entries in a database table) of the remote network management platform.

Advantageously, these techniques can be used to enable a unified approach for inter-platform data synchronization. Further, the disclosed procedures can be securely integrated into application-specific workflows or more general workflows that take place on the remote network management platform.

Accordingly, a first example embodiment may involve persistent storage containing: (i) a database table containing entries, (ii) a definition of a communication endpoint of a remote system, and (iii) outbound flow processing through which the entries can be synchronized with the remote system. The first example embodiment may also include one or more processors configured to: detect a state change associated with a local entry in the database table; read, from the database table, a set of data representing the local entry; transform, using the outbound flow processing, the set of data into a format receivable by the remote system; create, for the set of data, a correlation record that contains a local correlation identifier assigned by the system, wherein the correlation record specifies the local entry; transmit, to the remote system, the set of data as transformed and the local correlation identifier; receive, from the remote system and for the set of data, a remote correlation identifier assigned by the remote system; add, to the correlation record, the remote correlation identifier; and write, to a correlation table, the correlation record.

A second example embodiment may involve detecting a state change associated with a local entry in a database table, wherein persistent storage contains: (i) the database table, (ii) a definition of a communication endpoint of a remote system, and (iii) outbound flow processing through which the entries of the database table can be synchronized with the remote system. The second example embodiment may also involve reading, from the database table, a set of data representing the local entry. The second example embodiment may also involve transforming, using the outbound flow processing, the set of data into a format receivable by the remote system. The second example embodiment may also involve creating, for the set of data, a correlation record that contains a local correlation identifier assigned by the system, wherein the correlation record specifies the local entry. The second example embodiment may also involve transmitting, to the remote system, the set of data as transformed and the local correlation identifier. The second example embodiment may also involve receiving, from the remote system and for the set of data, a remote correlation identifier assigned by the remote system. The second example embodiment may also involve adding, to the correlation record, the remote correlation identifier. The second example embodiment may also involve writing, to a correlation table, the correlation record.

A third example embodiment may involve persistent storage containing: (i) a database table containing entries, (ii) definitions of an inbound application programming interface (API), and (iii) inbound flow processing through which the entries can be synchronized with a remote system. One or more processors may be configured to: receive, from the remote system and by way of the inbound API, a set of data with an remote correlation identifier assigned by the remote system; transform, using the inbound flow processing, the set of data into a format storable in the database table; create, for the set of data, a correlation record that contains a local correlation identifier and the remote correlation identifier, wherein the correlation record specifies a local entry in the database table; write, to the correlation table, the correlation record; and write, to the database table and as the local entry, the set of data as transformed.

A fourth example embodiment may involve receiving, from a remote system and by way of an inbound API, a set of data with an remote correlation identifier assigned by the remote system, wherein persistent storage contains: (i) a database table containing entries, (ii) definitions of the inbound API, and (iii) inbound flow processing through which the entries can be synchronized with the remote system. The fourth example embodiment may also involve transforming, using the inbound flow processing, the set of data into a format storable in the database table. The fourth example embodiment may also involve creating, for the set of data, a correlation record that contains a local correlation identifier and the remote correlation identifier, wherein the correlation record specifies a local entry in the database table. The fourth example embodiment may also involve writing, to the correlation table, the correlation record. The fourth example embodiment may also involve writing, to the database table and as the local entry, the set of data as transformed.

In a fifth example embodiment, an article of manufacture may include a non-transitory computer-readable medium, having stored thereon program instructions that, upon execution by a computing system, cause the computing system to perform operations in accordance with the first, second, third, and/or fourth example embodiment.

In a sixth example embodiment, a computing system may include at least one processor, as well as memory and program instructions. The program instructions may be stored in the memory, and upon execution by the at least one processor, cause the computing system to perform operations in accordance with the first, second, third, and/or fourth example embodiment.

In a seventh example embodiment, a system may include various means for carrying out each of the operations of the first, second, third, and/or fourth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 depicts a number of multi-platform integration scenarios, in accordance with example embodiments.

DETAILED DESCRIPTION

Figure 1:
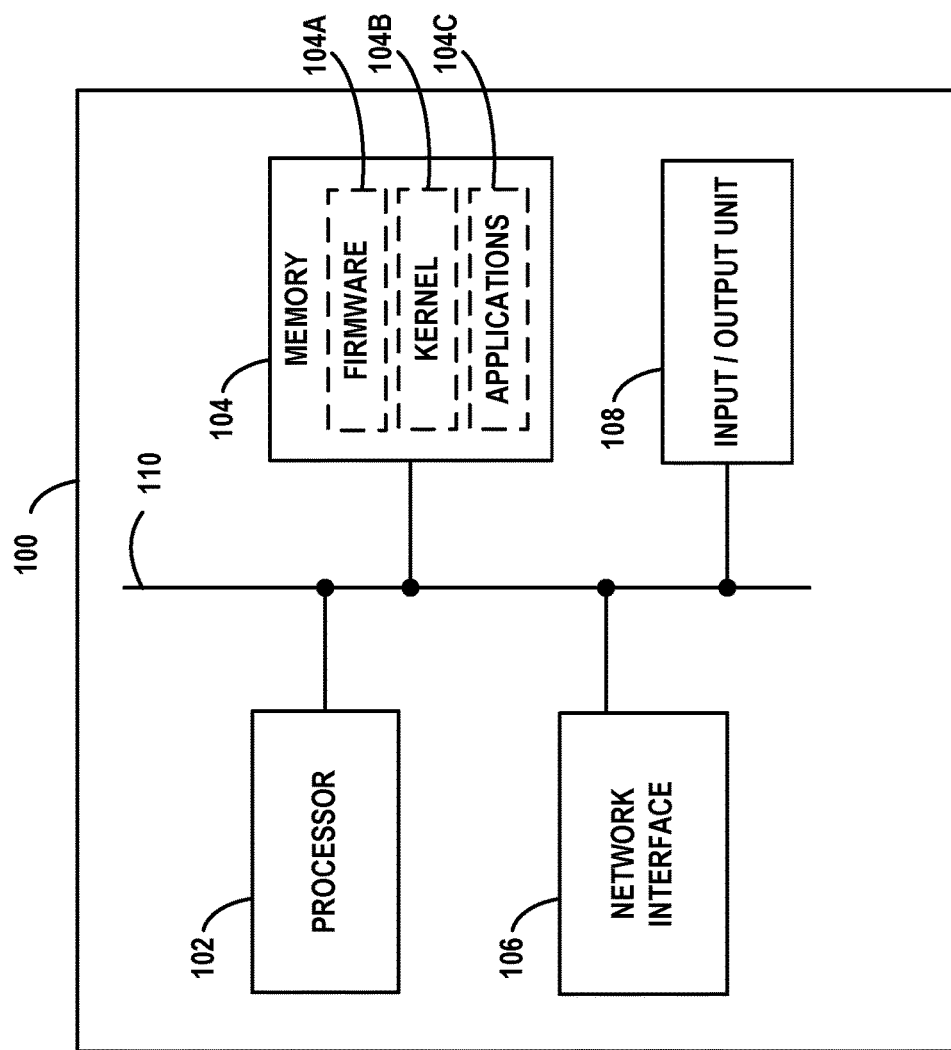
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
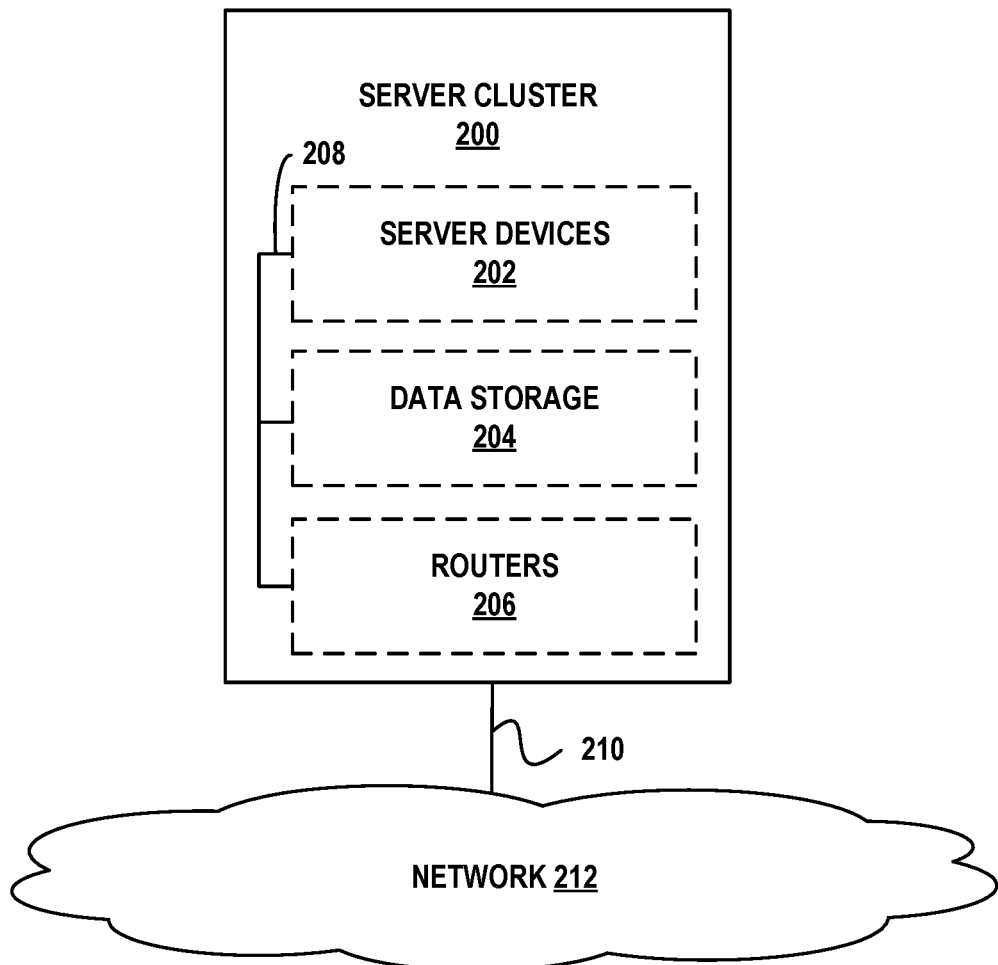
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
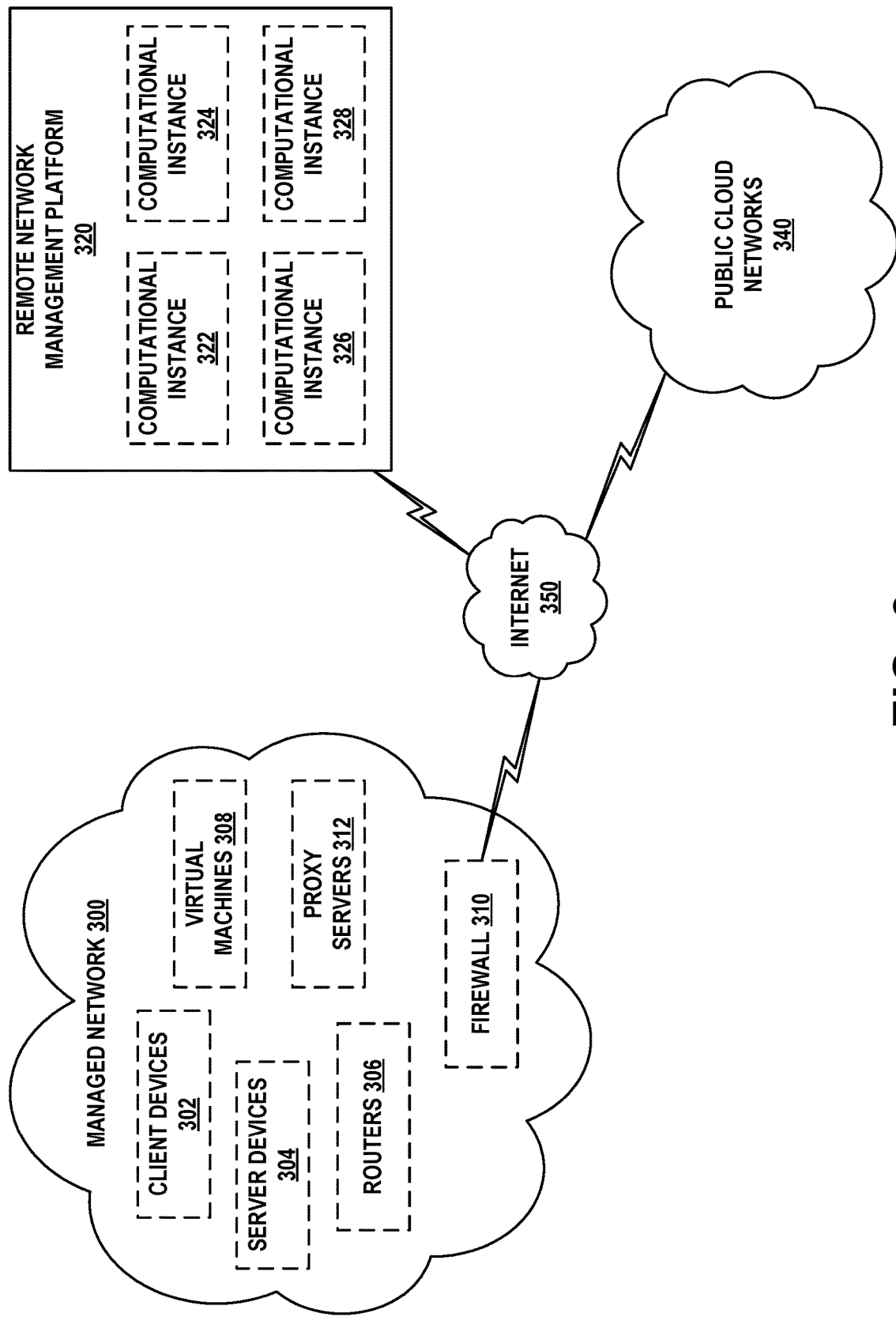
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
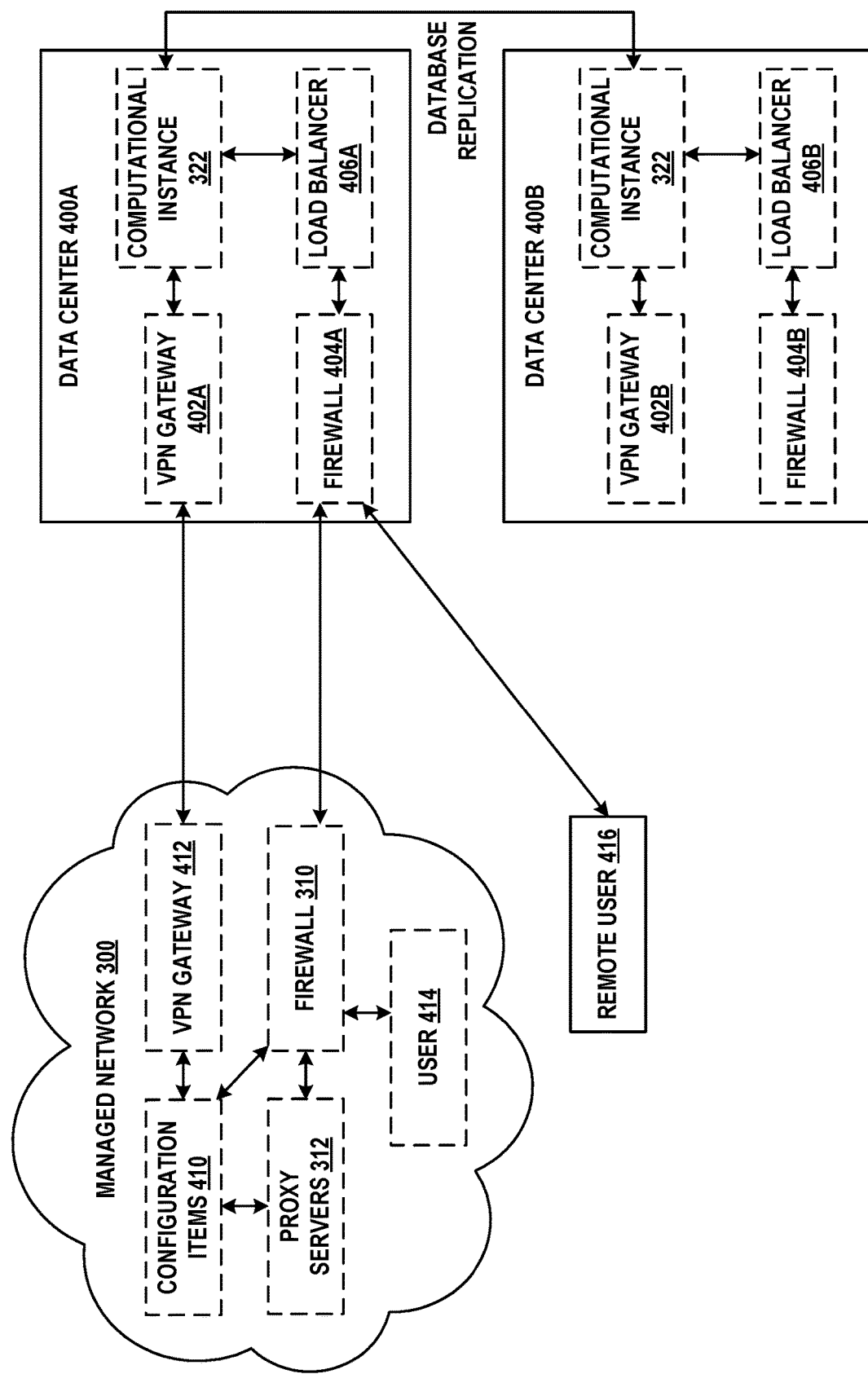
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
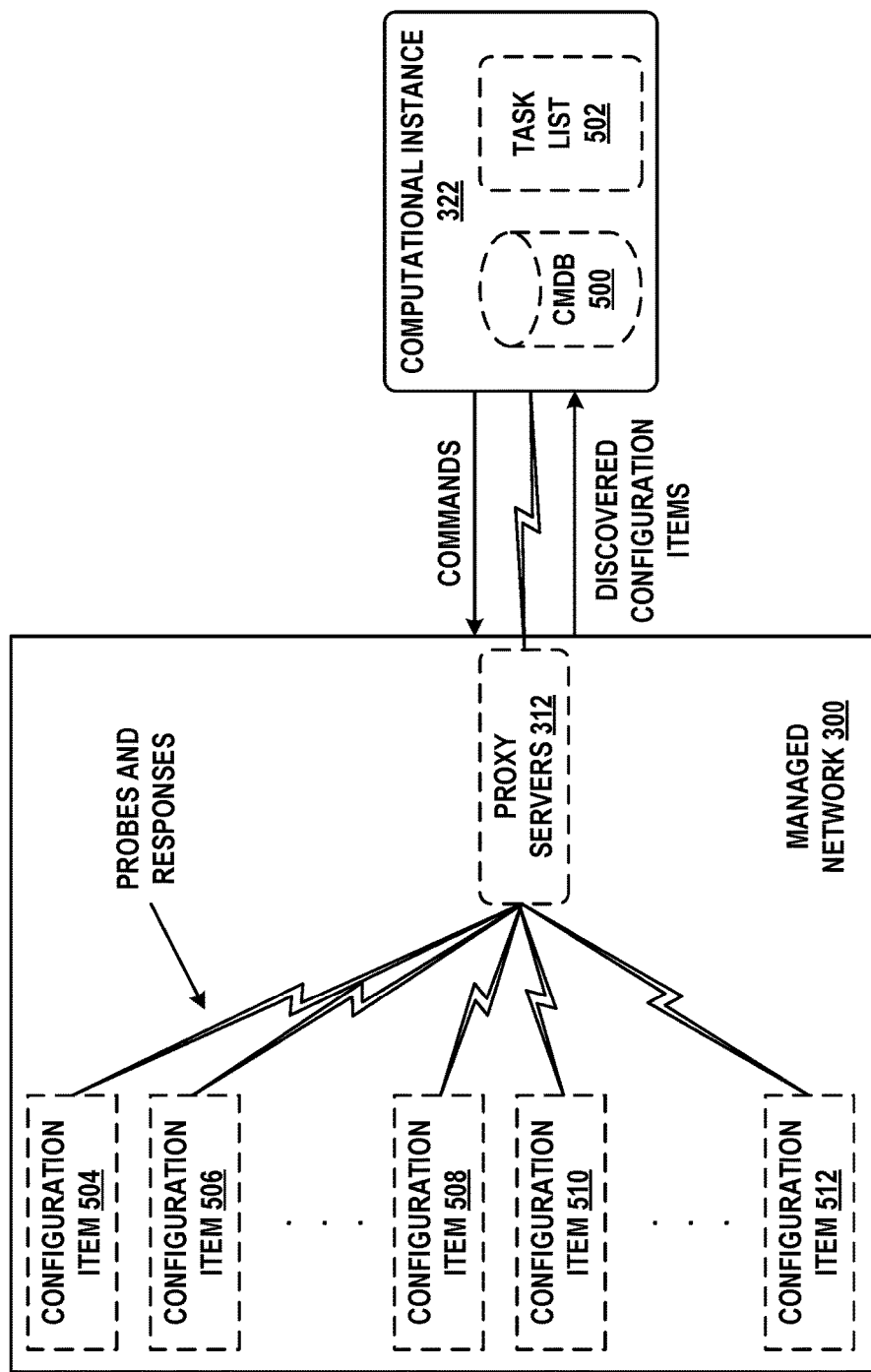
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
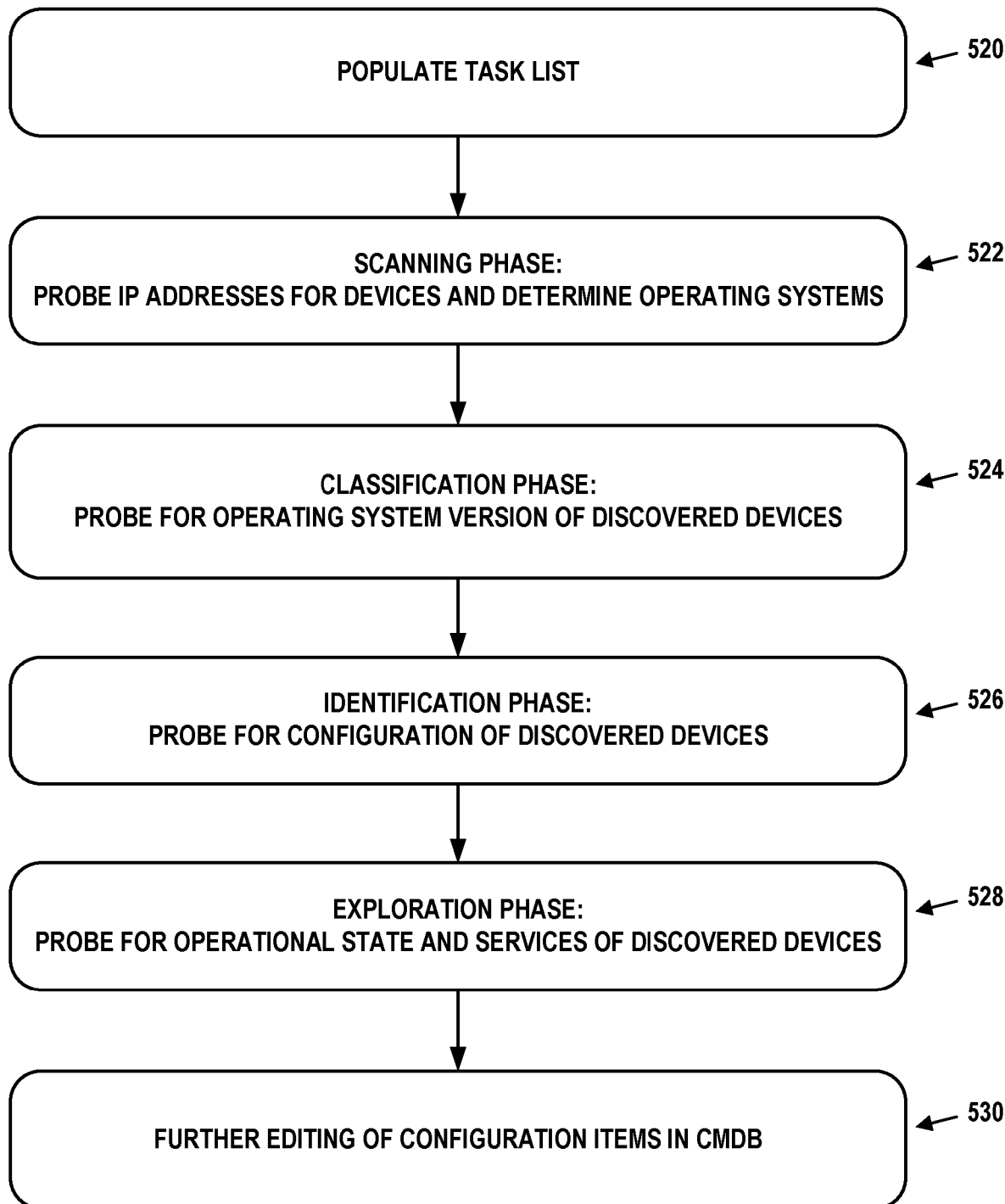
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Data Sharing Between Multiple Platforms or Computational Instances

As noted, a remote network management platform, such as remote network management platform 320, may include some number of computational instances, such as computational instance 322. Each computational instance may support a number of applications on behalf of an enterprise. Further, each application may store its data, configuration, and/or state in one or more databases.

From time to time, it may be advantageous to synchronize, or otherwise share, at least some of this data with remote applications operating on other computational instances or other platforms. As one example, an HR application on the enterprise's computational instance may store local copies of employee personnel records. However, the enterprise may outsource certain HR tasks (e.g., payroll, insurance) to a third-party HR service that needs to locally store its own accurate copy of this data. As another example, an incident management (i.e., trouble ticket) application on the enterprise's computational instance may store local copies of incidents opened by customers of the enterprise. Nonetheless, the enterprise may share relevant parts of this data with certain customers. In a further example, the enterprise may offer an employee purchasing program that allows its employees to purchase mobile phones and/or mobile phone services at a discount from a certain telecommunications provider. The enterprise's computational instance may store local copies of the pending and completed purchases. This data may be synchronized with the provider, and the provider may store a version of the data on its own cloud-based platform. These are just illustrative examples, and other uses may exist.

To enable this functionality, data may be transferred from the remote network management platform to another platform, received by the remote network management platform from the other platform, transmitted bi-directionally, and/or synchronized between the platforms. These types of communication are depicted in FIG. 6.

In this figure, arrangement 600 involves computational instance 322 (i.e., disposed within a remote network management platform) transmitting copies of its data to third-party platform 602. Arrangement 610 involves computational instance 322 receiving copies of data from third-party platform 612. Arrangement 620 involves computational instance 322 transmitting copies of its data to and receiving copies of data from third-party platform 622. In some embodiments, arrangement 620 may involve computational instance 322 synchronizing corresponding copies of data for one or more applications with third-party platform 622, so that this data is largely identical in terms of content if not form.

In some cases, a third-party platform could be another computational instance, possibly disposed within the same or a different remote network management platform as computational instance 322. For example, both computational instances may be used by the same enterprise, and the transactions between these computational instances may be data backup, data restore, or data synchronization. In other cases, a third-party platform may be physically or topologically remote from computational instance 322. The third-party platform may operate in a different fashion from computational instance 322 and may essentially be a "black box" to computational instance 322, accessible only by way of well-defined interfaces. In all of these cases, the communication may be referred to as "inter-platform" or "between platforms" even when the communication involves only computational instances of the same platform.

Described herein are inbound and outbound interfaces for a computational instance that can be used for synchronization and possibly other purposes. Also disclosed is the internal processing of data that is communicated to and/or from another platform. This processing can be integrated into application-specific or multi-application workflows in a consistent and logical fashion by using a standard framework with common functionality.

A. Process Sync Definition

In order for communication between platforms to take place, an endpoint should be explicitly configured on both platforms. For purposes of this disclosure, these endpoints are referred to as process sync definitions. Such a process sync definition is a parent structure that associates relevant configuration data defining how one platform that can communicate with a remote system.

Figure 7:
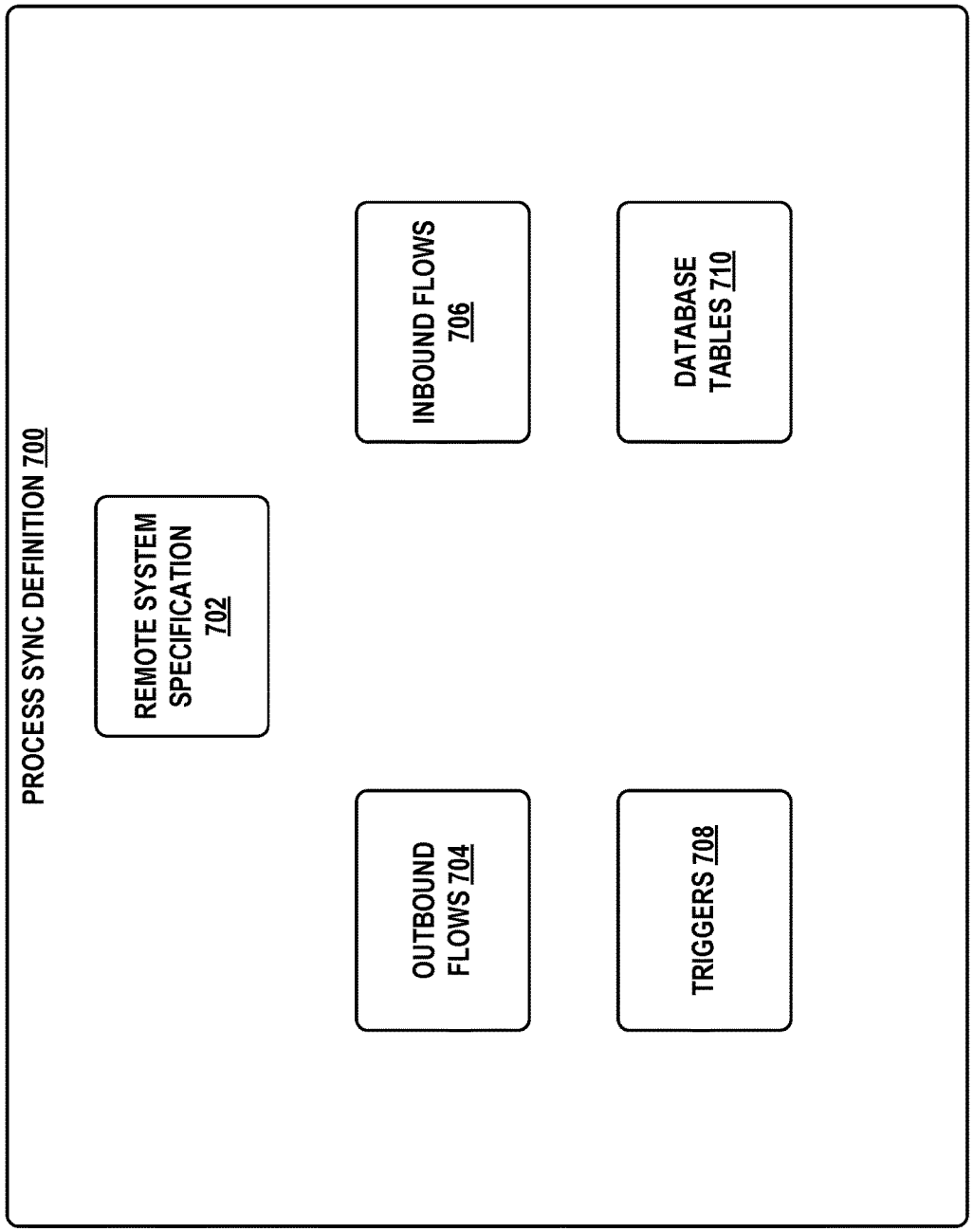
FIG. 7 depicts a process sync definition, in accordance with example embodiments.

FIG. 7 depicts an example process sync definition 700. It bundles further definitions, particularly remote system specification 702, outbound flows 704, inbound flows 706, triggers 708, and database tables 710. Process sync definition 700 may exist in a configuration file or as entries within a database for example.

In some cases, one or more of remote system specification 702, outbound flows 704, inbound flows 706, triggers 708, and database tables 710 may be references to data structures, executable code, or other information defined elsewhere in the computational instance. For example outbound flows 704 may include a reference to a flow defined outside of process sync definition 700, and database tables 710 may be defined in a database that is logically distinct from process sync definition 700.

Remote system specification 702 identifies a remote system to which the computational instance that contains process sync definition 700 is to communicate. As noted, this may be a different computational instance on the same remote network management platform, a different remote network management platform, or another type of remote computing system. Particularly, remote system specification 702 may include parameters and/or metadata that facilitates inter-system communication. In some cases, these parameters and metadata may define one or more IP addresses, domain names, TCP or UDP port numbers, uniform resource locators (URLs), and/or representational state transfer (REST) interfaces of a remote system.

Outbound flows 704 may be optional references to one or more workflows or subflows that process data that the computational instance is to send to the remote system identified by remote system specification 702. Inbound flows 706 may be optional references to one or more workflows or subflows that process data that the computational instance has received from the remote system identified by remote system specification 702.

Here, a workflow is program logic (e.g., software code) representing a specific sequence or series of tasks that, when performed, seek to accomplish one or more goals. In some cases, workflows may be represented or thought of as a state machine having two or more states connected by various transitions therebetween. Transitions from state to state may be triggered by or based on user input, automated input, information being stored in a database, the value of information in a database changing, or by way of other mechanisms. Workflows may be used by a computational instance to carry out automated processes, processes that guide a user through a series of interactions, or some combination thereof.

Subflows may be parts or subsets of workflows that are defined separately from the workflows themselves. Similar to subroutines in programming, subflows may carry out operations that are common to more than one workflow or get repeated in some fashion. Thus, the same subflow may be used by several different workflows, or just be a particular part of one workflow.

Triggers 708 specify one or more events occurring on the computational instance that cause data to be transmitted to the remote system identified by remote system specification 702. These events may be changes in state of one or more entries of database tables 710, association of attachments with any such entry, other database changes, application state changes, system state changes, and so on. In some cases, triggers 708 may capture all fields of a database entry or some subset of these fields.

Database tables 710, as noted above, may include references to one or more tables in a database implemented externally to process sync definition 700. In some cases, these references may be to specific entries within such tables. Where non-relational databases are used, these references may be to locations within a file or other data structure stored in such a database.

In some embodiments, a process event (not shown) may be associated with an outbound flow and/or an inbound flow. Such a process event ties the end-to-end synchronization logic together. In the outbound direction, a process event is associated with a trigger and is used to convey the "contextual meaning" of the synchronization process being defined. In the inbound direction, the process event is used to define the logic to ingest incoming data from the remote system.

B. Outbound Processing

Figure 8A:
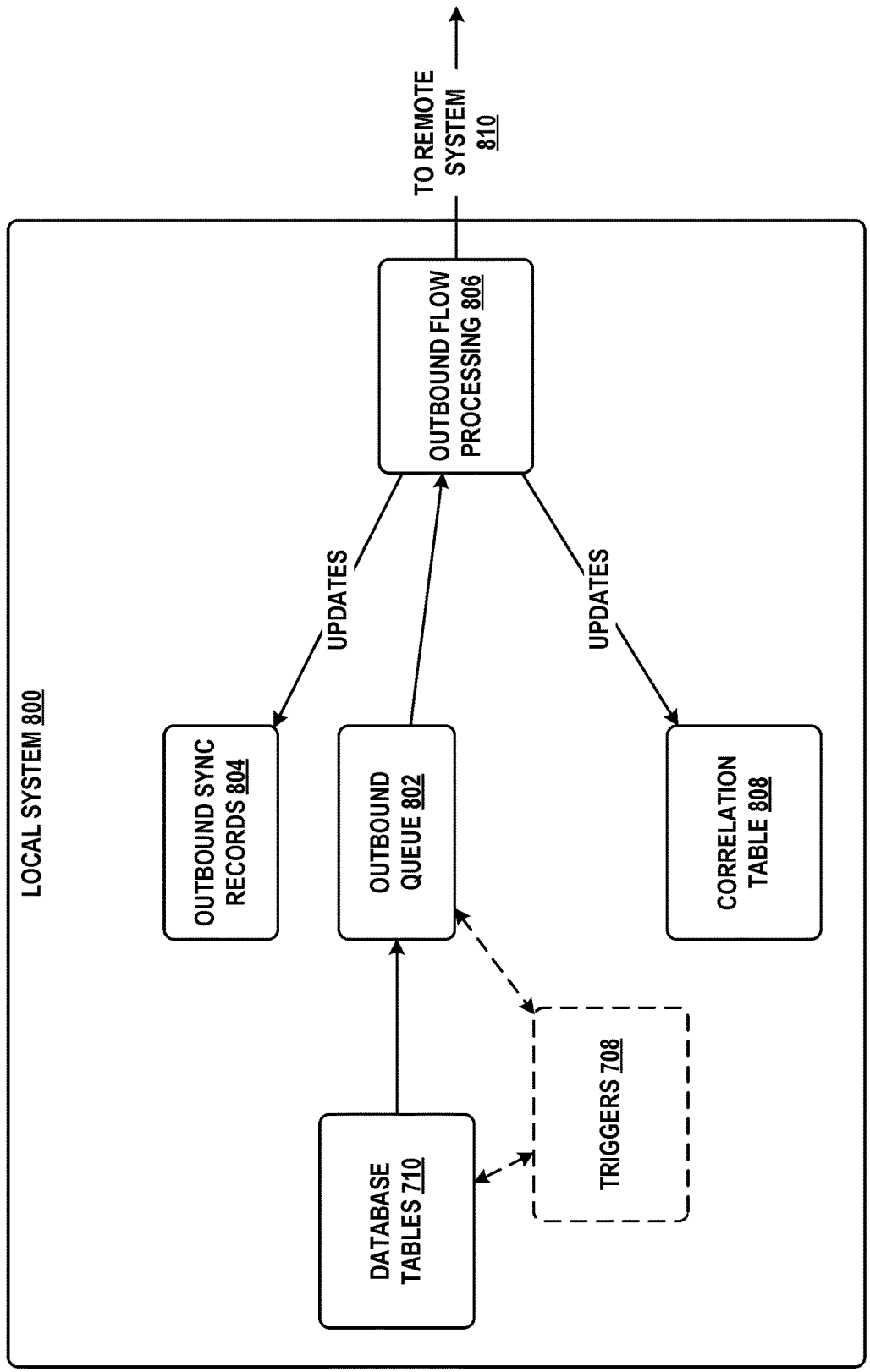
FIG. 8A depicts software components that facilitate outbound processing for synchronization, in accordance with example embodiments.

FIG. 8A depicts how the components of remote system specification 702 can be used to synchronize information from a computational instance to a remote system. Here, the computational instance is referred to as local system 800 and the operations of FIG. 8A are from the perspective of local system 800.

In particular, based on triggers 708, one or more entries from database tables 710 may be selected for synchronization with remote system 810. For example, triggers 708 may be facilitated by a database listener module (not shown) that is configured to monitor the state of certain database tables and/or entries, and identify when these tables or entries change or take on certain values. Alternatively or additionally, triggers 708 may include one or more modules that monitor the state of local system 800 and/or any applications thereon, and identify when these items change or take on certain values. When one of triggers 708 fire (i.e., due to a detected change), data from specific entries in database tables 710 (which need not be entries that changed) may be placed into outbound queue 802. For instance, triggers 708 may have associated logic that reads these entries from database tables 710 and writes copies to outbound queue 802.

Outbound queue 802 may be a data structure that can hold an ordered sequence of zero or more messages. Outbound queue 802 may also be associated with logic that facilitates the writing to, reading from, and management of this data structure. Such a queue can facilitate asynchronous communication between applications, processes, and/or threads. Communication facilitated by message queues is deemed to be asynchronous because a message may be stored in a queue for some period of time between when the message is written to the queue and the message is read from the queue.

While queues typically order the messages therein in a first-in-first-out (FIFO) fashion, non-FIFO orderings may be supported. This allows certain messages within a queue to have priority over others in terms of when they will be read. But many of the synchronization operations described herein preserve the ordering of messages in queues so that when a database entry on local system 800 is changed multiple times, these changes will be presented to remote system 810 in the same order of occurrence. This allows remote system 810 to maintain an accurate representation of the entry.

A scheduled job may be configured to process messages in outbound queue 802. This job may be arranged to execute for m seconds before pausing execution for n seconds. Thus, the scheduled job could have a duty cycle of m seconds every m+n seconds. Possible examples of these values may be m=300 and n=30, m=180 and n=10, and so on. When executing, the scheduled job reads one or more messages from outbound queue 802 (e.g., the next messages in FIFO order), identifies the outbound flow to apply to each message, and then causes outbound flow processing 806 to execute the identified outbound flows on the messages. Execution of each outbound flow may be synchronous with operation of the scheduled job, and last for a maximum oft seconds. Example values oft may be 10, 30, 60, and so on.

Outbound sync records 804 contain metadata and/or status representing the operations of outbound queue 802. This may include indications of successes, errors, and/or retries when executing outbound flow processing 806 on messages of outbound queue 802 or when transmitting messages to remote system 810.

Outbound flow processing 806 executes zero or more or outbound flows 704 on messages read from outbound queue 802. These outbound flows may be different per message, and metadata associated with each message may identify the outbound flow to be executed. Outbound flow processing 806 may reformat, modify, or otherwise transform data within the messages for transmission to remote system 810. For example, in some embodiments, entries in database tables 710 may be transformed into a structured data format, such as XML or JAVASCRIPT® Object Notation (JSON), for transmission to a REST interface on remote system 810. But other possibilities exist.

As noted, outbound flow processing 806 may also update outbound sync records 804 to indicate successes, errors, and/or retries related to messages. Further, outbound flow processing 806 may create records, update records, and/or look up records in correlation table 808. More detail regarding the use of correlation table 808 is given below.

C. Inbound Processing

Figure 8B:
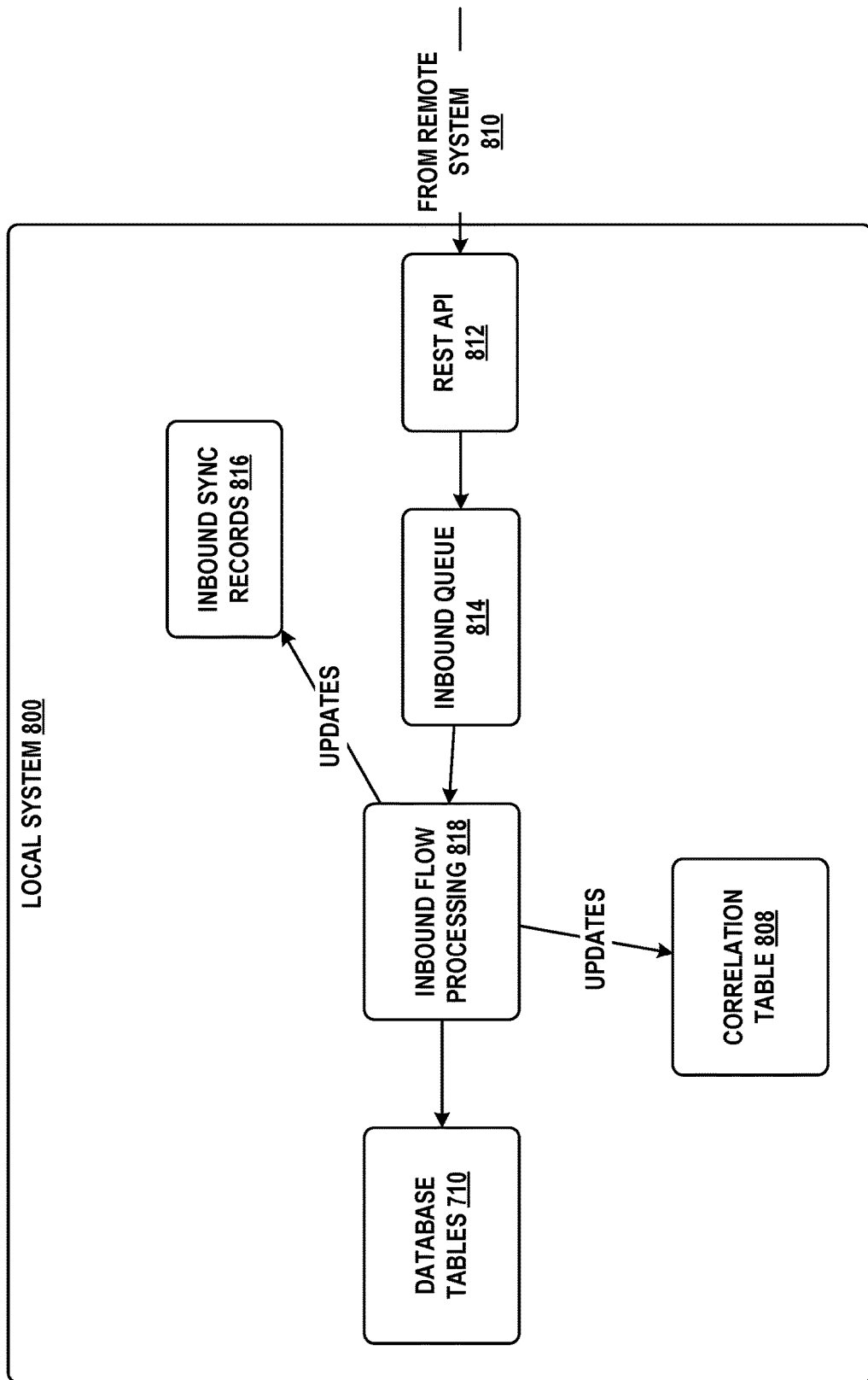
FIG. 8B depicts software components that facilitate inbound processing for synchronization, in accordance with example embodiments.

FIG. 8B depicts how the components of remote system specification 702 can be used to synchronize information from a remote system to a computation instance. Again, the computational instance is referred to as local system 800 and the operations of FIG. 8B are from the perspective of local system 800.

Data is received from remote system 810 by way of REST API 812. REST API 812 may be a URL-based interface that allows remote system 810 to write data to local system 800 in a secure and authorized fashion. For example, remote system 810 may use the REST POST command to write to a queue URL (e.g., www.example1.com/queue). Data written to this URL causes local system 800 to authenticate the request, validate the data, and write the data to inbound queue 814. Several other URLs may be part of this interface, each of which will be described below. Other types of non-REST interfaces may be supported.

Like outbound queue 802, inbound queue 814 may be a data structure that can hold an ordered sequence of zero or more messages. Inbound queue 814 may also be associated with logic that facilitates the writing to, reading from, and management of this data structure. FIFO and non-FIFO orderings of messages may be supported.

Also like outbound queue 802, a scheduled job may be configured to process messages in inbound queue 814. This job may be arranged to execute for m seconds before pausing execution for n seconds. Thus, the scheduled job could have a duty cycle of m seconds every m+n seconds. Possible examples of these values may be m=300 and n=30, m=180 and n=10, and so on. When executing, the job reads one or more messages from inbound queue 814 (e.g., the next messages in FIFO order), identifies the inbound flow to apply to each message, and then causes inbound flow processing 818 to execute the identified inbound flows on the messages. Execution of each inbound flow may be synchronous with operation of the scheduled job, and last for a maximum oft seconds. Example values oft may be 10, 30, 60, and so on. Notably, the values for m, n, and t can be different for outbound queue 802 and inbound queue 814.

Inbound sync records 816 contain metadata and/or status representing the operations of inbound queue 814. This may include indications of successes, errors, and/or retries when executing inbound flow processing 818 on messages of inbound queue 814 or when writing entries derived from these message to database tables 710.

Inbound flow processing 818 executes zero or more of inbound flows 706 on messages read from inbound queue 814. These inbound flows may be different per message, and metadata associated with each message may identify the inbound flow to be executed. Inbound flow processing 818 may reformat, modify, or otherwise transform data within the messages for storage in database tables 710. For example, in some embodiments, messages that were received from remote system 810 in a structured data format, such as XML or JSON, are transformed to entries in database tables 710. Notably, inbound flow processing 818 may write to the same or different database tables and entries as outbound flow processing 806.

As noted, inbound flow processing 818 may also update inbound sync records 816 to indicate successes, errors, and/or retries related to messages. Further, inbound flow processing 818 may create records, update records, and/or look up records in correlation table 808. More detail regarding the use of correlation table 808 is given below.

D. Correlation Tables and Correlation Procedures

Figure 9:
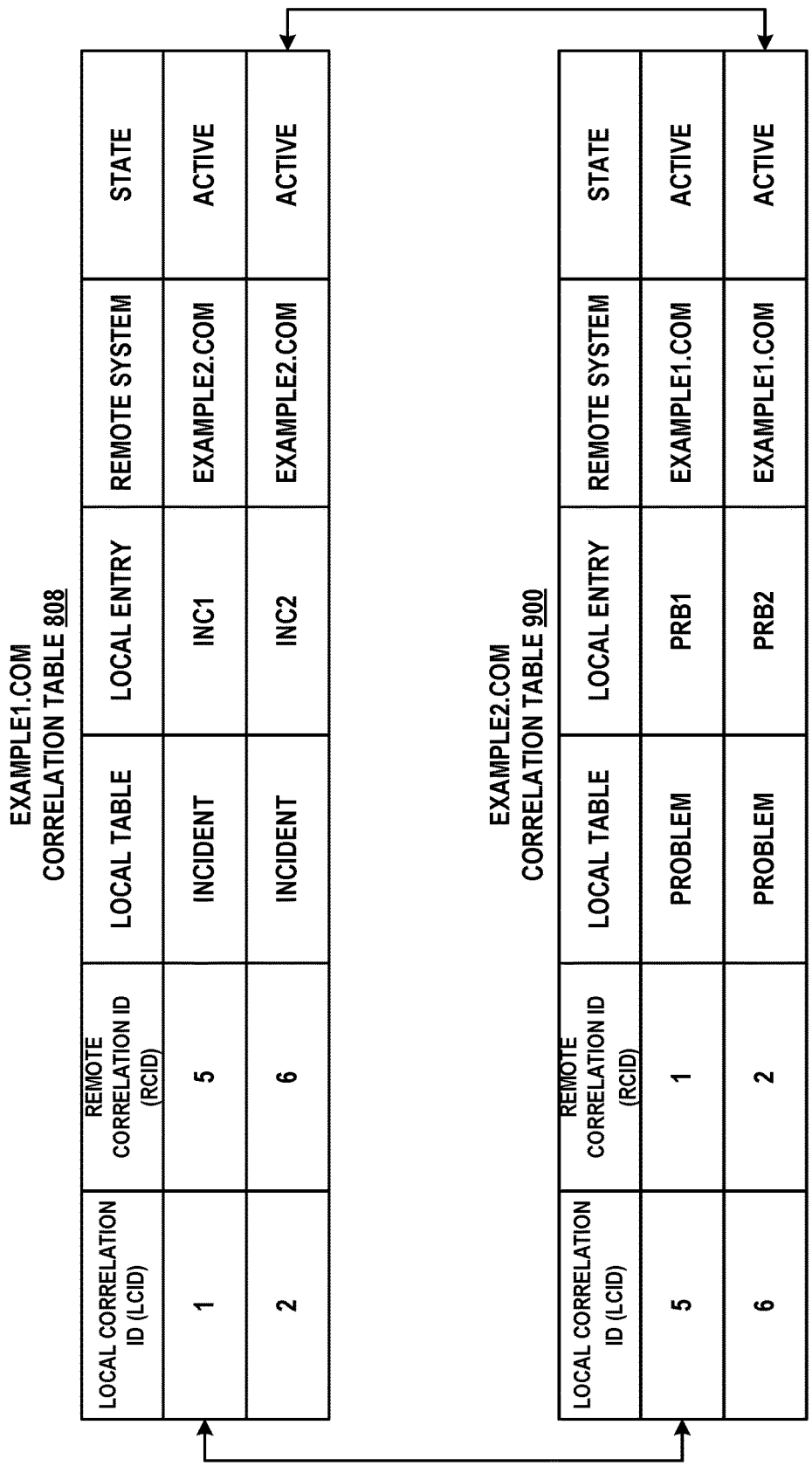
FIG. 9 depicts correlation tables, in accordance with example embodiments.

FIG. 9 depicts two example correlation tables. Correlation table 808 was briefly discussed in the context of FIGS. 8A and 8B, and is stored on or accessible to local system 800. Correlation table 808 is used when local system 800 synchronizes with remote system 810. Correlation table 900 is stored on or accessible to remote system 810.

These correlation tables contain records of associations between entries in database tables 710 of local system 800 and entries in database tables of remote system 810. They facilitate the synchronization of these entries between local system 800 and remote system 810, even when the entries are in different formats. In FIG. 9, correlation table 808 and correlation table 900 are arranged similarly (in terms the data contained therein), but in some embodiments they may have different arrangements.

Correlation table 808 contains mappings between a local correlation identifier (LCD), remote correlation identifier (RCID), local table, local entry, and remote system. These mappings may also have associated states, such as "active" for mappings that are operational or "inactive" for mappings that are not operational.

The LCID field contains a value (e.g., numeric, alphanumeric, or otherwise) that uniquely identifies the record on local system 800. The RCID field contains a value (e.g., numeric, alphanumeric, or otherwise) that uniquely identifies the record on remote system 810. Local system 800 may assign the LCID while remote system 810 may assign the RCID. Thus, local system 800 might always know the LCID for a record, but might not know the RCID for the record until remote system 810 informs local system 800 of the RCID. The local table field identifies one of database tables 710, and the local entry field identifies an entry within this database table. The remote system field identifies remote system 810.

As an example, the first record in correlation table 808 can be interpreted as follows. Entry INC1 of database table Incident has a LCID of 1 and an RCID of 5. The RCID was assigned by the remote system, example2.com. The state of this association is active. Likewise, the second record in correlation table 808 can be interpreted as follows. Entry INC2 of database table Incident has a LCID of 2 and an RCID of 6. The RCID was assigned by the remote system, example2.com.

As noted, correlation table 900 is stored or is otherwise accessible to remote system 810 (named example2.com in this case). Thus, correlation table 900 might not be visible to local system 800. Further, the context of "local" and "remote" is reversed in correlation table 900 (when compared to correlation table 808) because the content of this table is with respect to remote system 810. Therefore, the LCIDs in correlation table 900 are local with respect to remote system 810, and map to the RCIDs in correlation table 808. Similarly, the RCIDs in correlation table 900 are remote with respect to remote system 810, and map to the LCIDs in correlation table 808.

FIG. 9 shows correlated records as they might appear in different correlation tables. As indicated by the arrows, the record for local entry INC1 in correlation table 808 relates to the record for local entry PRB1 in correlation table 900. Likewise, the record for local entry INC2 in correlation table 808 relates to the record for local entry PRB2 in correlation table 900. These correlated records refer to and/or contain the same or similar underlying data and may refer to the same event, but are stored in different formats by local system 800 and remote system 810.

In various embodiments, correlation tables may contain more or fewer entries, and each entry may contain more or less information. The structure of the correlation tables shown in FIG. 9 supports the same local entry being synchronized with multiple remote systems. In such cases, each remote system may be assigned its own process sync definition, remote system specification, outbound flows, inbound flows, triggers, and so on. The next subsection illustrates how correlation tables can be populated.

E. Use of Correlation Tables During Outbound Synchronization

Figure 10A:
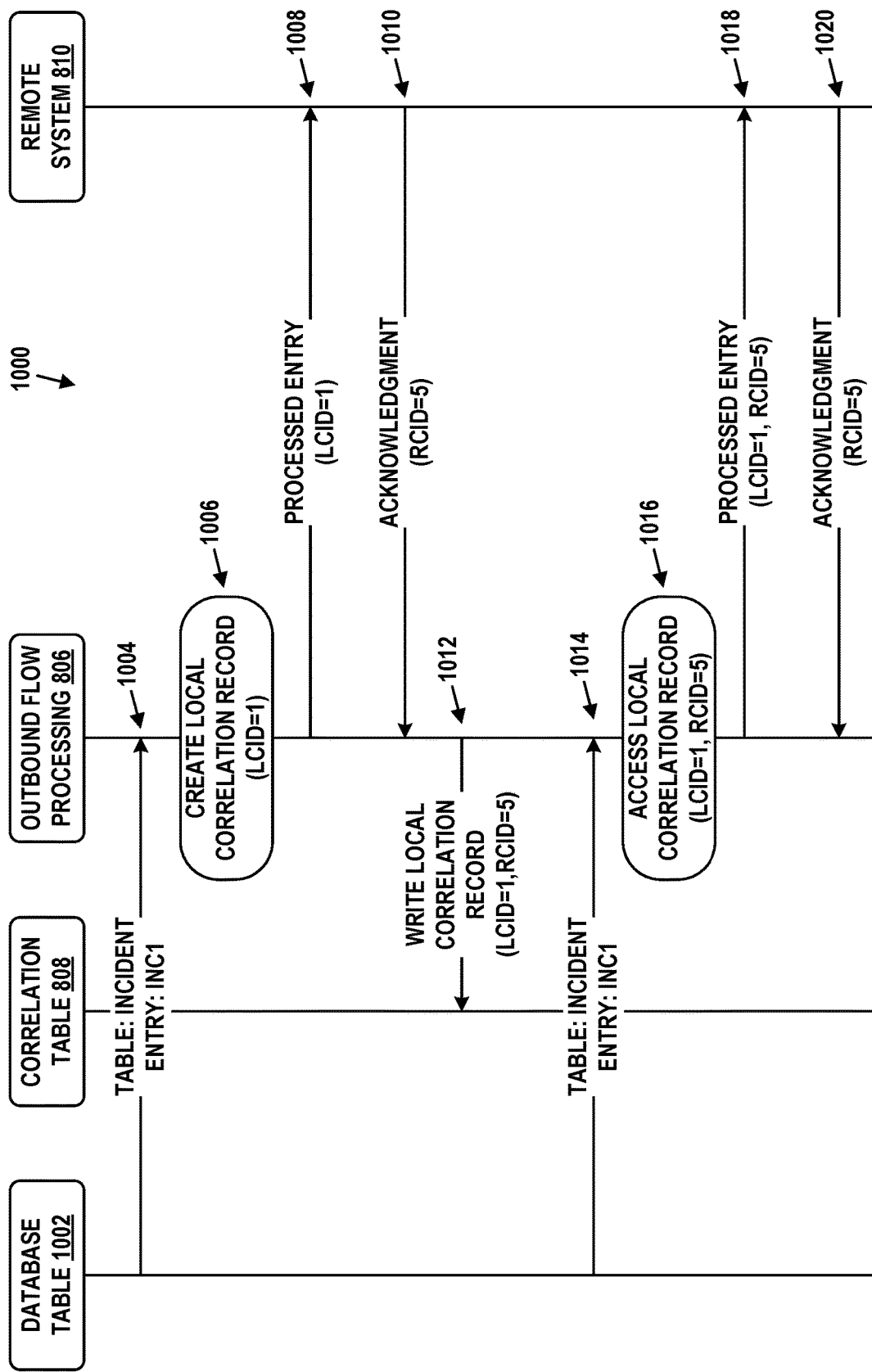
FIG. 10A is a message flow diagram for outbound synchronization, in accordance with example embodiments.

FIG. 10A is a message flow diagram 1000 depicting a possible embodiment for use of a correlation table using outbound synchronization on local system 800. In this figure, it is assumed that local system 800 is configured to synchronize an entry from database table 1002 with remote system 810. It is further assumed that local system 800 is also configured to use correlation table 808 and outbound flow processing 806 as part of this process.

At step 1004, entry INC1 from database table 1002 (the Incident table) is provided to outbound flow processing 806. Outbound flow processing 806 may read the entry directly from database table 1002 or by way of outbound queue 802. Outbound queue 802 is not shown in FIG. 10A for sake of simplicity, but may be present nonetheless.

At step 1006, outbound flow processing 806 creates a local correlation record and assigns an LCID of 1 to the record. This record is assumed to be that of the first entry in correlation table 808 as shown in FIG. 9. Outbound flow processing 806 also carries out any pre-configured transformation of the entry as discussed above.

At step 1008, the processed entry is transmitted to remote system 810. Also transmitted is metadata indicating that the LCID of 1 has been assigned by local system 800. This informs remote system 810 of this LCID so that remote system 800 can construct an entry for its correlation table.

At step 1010, remote system 810 transmits an acknowledgment in response to receiving the entry. This acknowledgment is transmitted to local system 800 and may be received by outbound flow processing 806. The acknowledgment may contain an indication that remote system 810 has assigned correlation identifier of 5 for this entry. From the perspective of remote system 810, this is an LCID but from the perspective of local system 800, this is an RCID.

At step 1012, outbound flow processing writes the local correlation record with an LCID of 1 and an RCID of 5 to correlation table 808. In some embodiments, outbound flow processing may write a partial local correlation record to correlation table 808 between steps 1006 and 1008, and then update this record at step 1012.

Once a record in correlation table 808 is established, it can be used in further outbound (and inbound) processing. For example, at some point after step 1012, steps 1014, 1016, 1018, and 1020 might take place.

At step 1014, entry INC1 from database table 1002 is again provided to outbound flow processing 806 (e.g., perhaps because the content of the entry has changed). Outbound flow processing 806 may read the entry directly from database table 1002 or by way of outbound queue 802.

At step 1016, outbound flow processing 806 accesses the local correlation record to determine the LCID and the RCID. Notably, the local correlation record does not need to be created at this point because it already exists. Outbound flow processing 806 also carries out any pre-configured transformation of the entry as discussed above.

At step 1018, the processed entry is transmitted to remote system 810. Also transmitted is metadata indicating that the LCID of 1 has been assigned by local system 800 and that the RCID of 5 has been assigned by remote system 810. As noted above, from the perspective of remote system 810, this RCID of 5 is an LCID. Nonetheless, the LCID and RCID are provided to remote system 810 so that it can identify the entry in its correlation table.

At step 1020, remote system 810 transmits an acknowledgment to local system 800, which is received by outbound flow processing 806. The RCID in the acknowledgment may match that of the associated local correlation record in correlation table 808. If it does not (e.g., the RCID has a value of 10 in the acknowledgment), outbound flow processing 806 may create a new local correlation record in correlation table 808 (e.g., with an LCID of 1 and an RCID of 10).

Advantageously, the correlation record for synchronizing entry INC1 with remote system 810 is created just once and then may be reused multiple times throughout the lifecycle of entry INC1.

F. Use of Correlation Tables During Inbound Synchronization

Figure 10B:
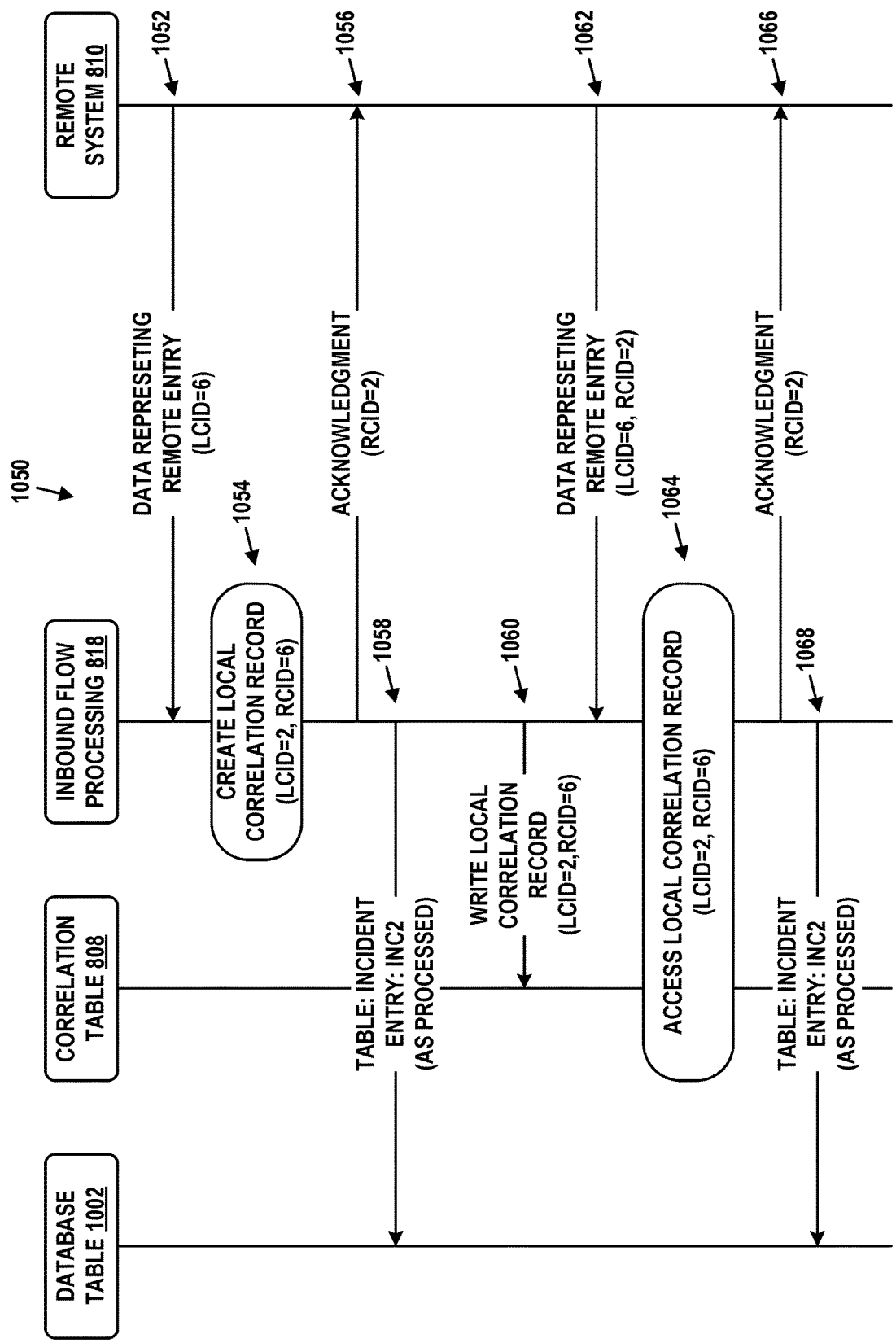
FIG. 10B is a message flow diagram for inbound synchronization, in accordance with example embodiments.

FIG. 10B is a message flow diagram 1050 depicting a possible embodiment for use of a correlation table using inbound synchronization on local system 800. In this figure, it is assumed that local system 800 is configured to synchronize an entry from database table 1002 with remote system 810. It is further assumed that local system 800 is also configured to use correlation table 808 and inbound flow processing 818 as part of this process.

At step 1052, inbound flow processing 818 receives data representing a remote entry from remote system 810. In some cases, this entry is received by way of REST API 812 and temporarily stored in inbound queue 814 before it is available to inbound flow processing 818 (not shown for sake of convenience). It is assumed that this entry has an LCID of 6 as assigned by remote system 810.

At step 1054, inbound flow processing 818 creates a local correlation record with an LCID of 2 and an RCID of 6. Here, the LCID is generated by inbound flow processing 818 while the RCID was received as the LCID of remote system 810. This record is assumed to be that of the second entry in correlation table 808 as shown in FIG. 9.

At step 1056 and in response to receiving the data, inbound flow processing 818 transmits an acknowledgment with an RCID of 2 to remote system 810. This acknowledgment serves to provide remote system 810 with the LCID assigned by local system 800. From the perspective of remote system 810, this LCID is an RCID, and therefore it is designated as such.

At step 1058, inbound flow processing 818 writes the remote entry as processed to database table 1002. Here it is assumed that this is the Incident table, and the entry is INC2. This entry may already exist in the table or may be added to the table as a new entry.

At step 1060, inbound flow processing writes the local correlation record with an LCID of 2 and an RCID of 6 to correlation table 808. In some cases, step 1060 may occur before step 1058. The information that identifies the database table and entry may be derived by inbound flow processing from content of the remote entry. When initial data representing a remote entry is received, the inbound flow to execute is selected by (among other things, per the system configuration) the process event of the inbound data. Usually, each particular inbound flow is configured to write to a particular table (in this case, the Incident table). In this way, different process events may be mapped to different tables on the inbound side. In the case of initial data, the entry INC2 does not already exist. Rather the inbound flow creates it.

Once a record in correlation table 808 is established, it can be used in further inbound (and outbound) processing. For example, at some point after step 1060, steps 1062, 1064, 1066, and 1068 might take place.

At step 1062, inbound flow processing 818 again receives data representing the entry associated with the LCID of 2 and RCID of 6. This data may have been read from inbound queue 814, for example.

At step 1064, inbound flow processing 818 identifies the associated correlation record in correlation table 808. Since this record exists, a new record does not need to be created.

At step 1066 and in response to receiving the data, inbound flow processing 818 transmits an acknowledgement to remote system 810. This acknowledgment serves to provide remote system 810 with the LCID assigned by local system 800. In this case, it affirms that local system 800 is still using the LCID of 2 (which is an RCID of 2 from the perspective of remote system 810).

At step 1068 and based on the information in the record, inbound flow processing 818 writes the remote entry as processed to database table 1002.

Advantageously, the correlation record for synchronizing entry INC2 with remote system 810 is created just once and then may be reused multiple times throughout the lifecycle of entry INC2.

The embodiments of FIGS. 10A and 10B are for purposes of example. Other message flows could be used to accomplish the same or similar goals. While processing related to just one database entry is shown in FIGS. 10A and 10B, these embodiments may support the processing of multiple entries across one or more database tables.

G. Attachment Processing

Each entry in a database (e.g., entry INC1 of the incidents table) may be associated with one or more attachments. These attachments may be text files, image files, sound files, video files, executable files, crashdump files, log files, or any other type of computer file that is deemed to be useful context for the entry. For example, if the entry is an IT incident, a log file that provides a series of error messages from one or more applications may be attached to the incident.

When attachments are associated with or disassociated from an entry, triggers 708 may detect these changes and ultimately cause outbound flow processing 806 to be carried on the entry and/or its attachments. Since these attachments could be larger than their associated database entries (e.g., in the megabytes whereas database entries might be a few hundred bytes), it is desirable to be able to transfer attachments from a local system to a remote system only as needed. In particular, it is advantageous for the local system and the remote system to have interfaces through which the remote system can securely request and receive only the desired attachments.

Figure 11:
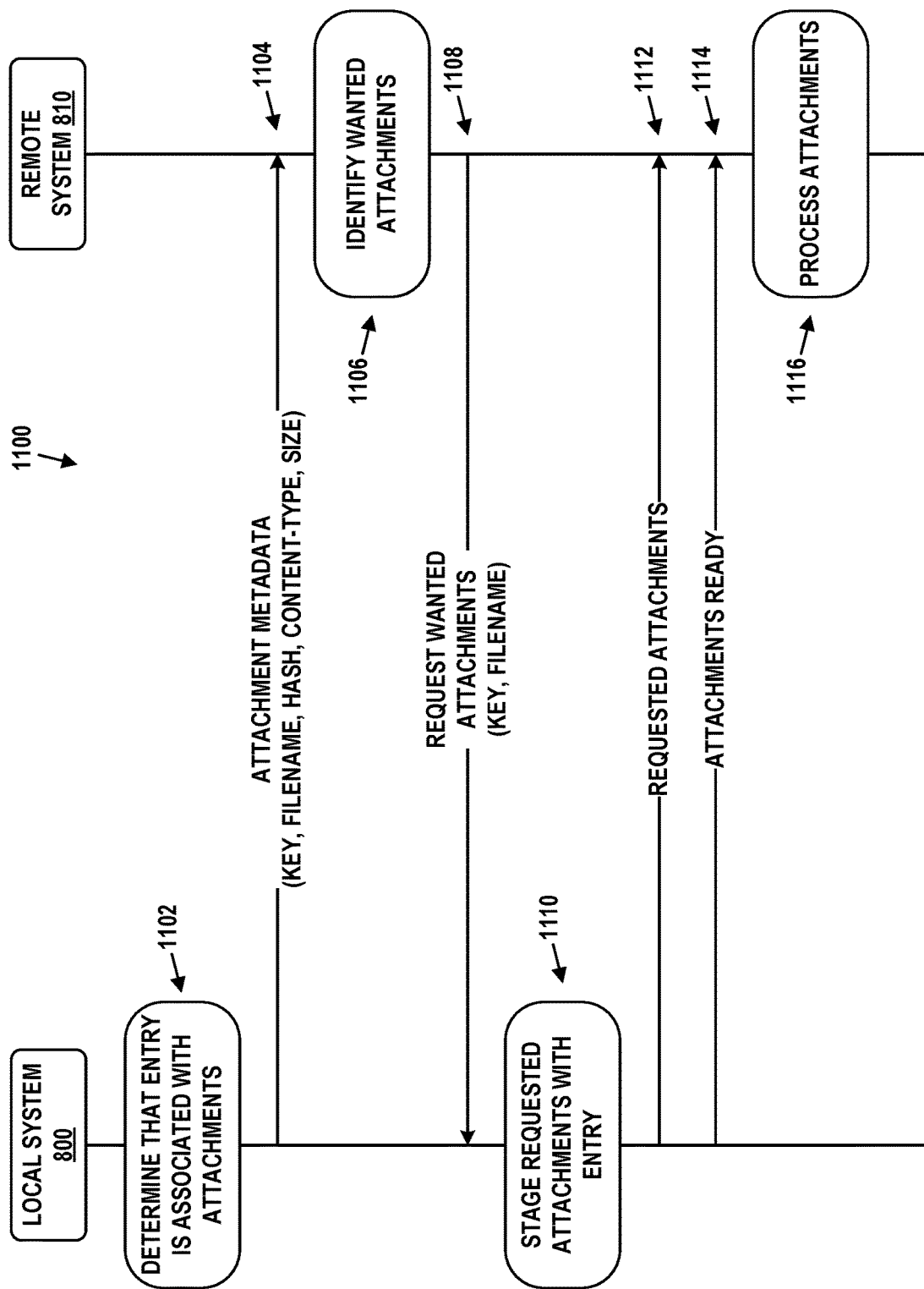
FIG. 11 is a message flow diagram for securely providing attachments, in accordance with example embodiments.

FIG. 11 is a message flow diagram 1100 depicting such a transaction. This message flow is shown as taking place between local system 800 and remote system 810, but may also involve triggers, inbound and outbound queues, correlation tables, and inbound and outbound flow processing modules as described above.

At step 1102, local system 800 determines that a database entry is associated with one or more attachments. In response, local system 800 may generate or otherwise identify attachment metadata.

At step 1104, local system transmits, to remote system 810, attachment metadata. This may include, for each attachment, one or more of a cryptographic key, a filename of the attachment, a cryptographic hash value calculated over the attachment (e.g., using SHA-1 or SHA-2), a content-type of the attachment (e.g., text/plain or image/jpeg), and a file size (e.g., in bytes) of the attachment. The cryptographic key(s) may be, for example a random array of 128 bits or 256 bits and separately generated for each attachment or set of attachments. Thus, in some cases, one cryptographic key may be used for multiple attachments. In other cases, each attachment may have its own cryptographic key.

At step 1106, remote system 810 identifies, from the attachment metadata, the wanted attachments. This may be none of the attachments, all of the attachments, or some subset of the attachments.

At step 1108, remote system 810 requests the wanted attachments from local system 800. This may involve remote system 810 providing one or more cryptographic keys and associated filenames to local system 800. Notably, unless the proper associations between cryptographic keys and filenames are provided, local system 800 may deny the request. Further the key may be a time-bound, temporary shared secret and thus expire after some period (e.g., 5 minutes, 30 minutes). This provides a degree of security that prevents systems without knowledge of the keys and/or filenames from obtaining the attachments.

In response and at step 1110, local system 800 may stage the requested attachments to be transmitted with or without the entry. This staging may involve these attachments being queued for outbound flow processing, for example.

At step 1112, local system 800 may transmit the requested attachments to a REST API or other established interface on remote system 810. Remote system 810 may passively receive, or otherwise receive, these attachments.

At step 1114, local system 800 may transmit a message to remote system 810 that all of the requested attachments have been provided and are ready for processing. At step 1116 and in response to receiving this message, remote system 810 may process these attachments. This processing may involve storing the attachments in a database or filesystem and associating them with the entry.

H. Error Handling

Error handling for the synchronization techniques described above may include one or more aspects of the following functionality. In particular, there are two main types of errors that synchronization procedures may experience: communication errors between a local system and a remote system, and processing errors within a local system or a remote system.

Communication errors may include a remote system being unreachable or errors experienced when transmitting data to a remote system. Communication errors are handled by the system that is carrying out the outbound processing. When such a communication error occurs, the transmissions are retried a configurable number of times (e.g., 2, 3, 5). If the errors are experienced for each of these retries, the local system flags outbound communication to the remote system as being in an error state. The local system may then continue to retry after pausing for a period of time. This behavior reflects the understanding that communication errors occur from time to time and are often self-correcting.

Processing errors occur during inbound or outbound flow processing, and represent a more serious problem. Specifically, that data from a local or remote entry cannot be properly processed. When a processing error occurs in the inbound or outbound direction, processing in that direction is placed in an error state. Further, a subflow may be triggered that carries out an automated assessment to determine a root cause, and/or notifies an administrator of the problem. In some embodiments, an administrator has to manually clear the error state before communication in the direction that experienced the error can be resumed. In some cases, queued entries can be individually configured to retry on error or be skipped when errors occur.

I. Establishing an Inter-Platform Communication Endpoint

Before communication occurs between a local system and a remote system, the local system may need to be configured to support the communication. A similar configuration procedure may take place on the remote system. This configuration can be carried out in three phases.

The first phase involves an administrator of the local system creating a local inbound API user (e.g., a userid) with a role that can receive inbound data from the remote system. This userid may have attached to it specific permissions and/or capabilities so that it can receive synchronization data by way of a REST API, for example, and write this data to an inbound queue. Then, the administrator may configure the remote system specification in the process sync definition (see FIG. 7). As noted, the remote system specification may include one or more IP addresses, domain names, TCP or UDP port numbers, URLs, and/or REST interfaces of the remote system. The REST interfaces may be endpoints accessible by way of GET or POST methods. Then, the administrator may provide the credentials of the local inbound API user and a unique local system identifier (sys_id) of the local system with an administrator of the remote system. The administrator may also receive credentials of a remote inbound API user of the remote system as well as a unique remote system identifier of the remote system from the administrator of the remote system.

The second phase may involve configuring, on the local system, the remote inbound API user as an endpoint of the remote system with which the local system can communicate. Also, the administrator of the local system may include the remote system identifier in the remote system specification.

The third phase may involve testing the ability of the local system to communicate with the remote system by way of the remote system specification (and, in particular, using the remote inbound API user). Once this testing has succeeded, the outbound and inbound flow processing associated with the remote system can be activated.

J. Domain Separation

A computational instance may support multiple domains and enforce separation between them. For example, the entity that operates a computational instance (e.g., local system 800) may allow two other entities (e.g., abc.com and xyz.com) to both use the applications of the computational instance in an outsourced manner. In these cases, domain separation allows transactions between these entities and a third party (e.g., remote system 810) to be per-domain for purposes of integrity and security.

Figure 12:
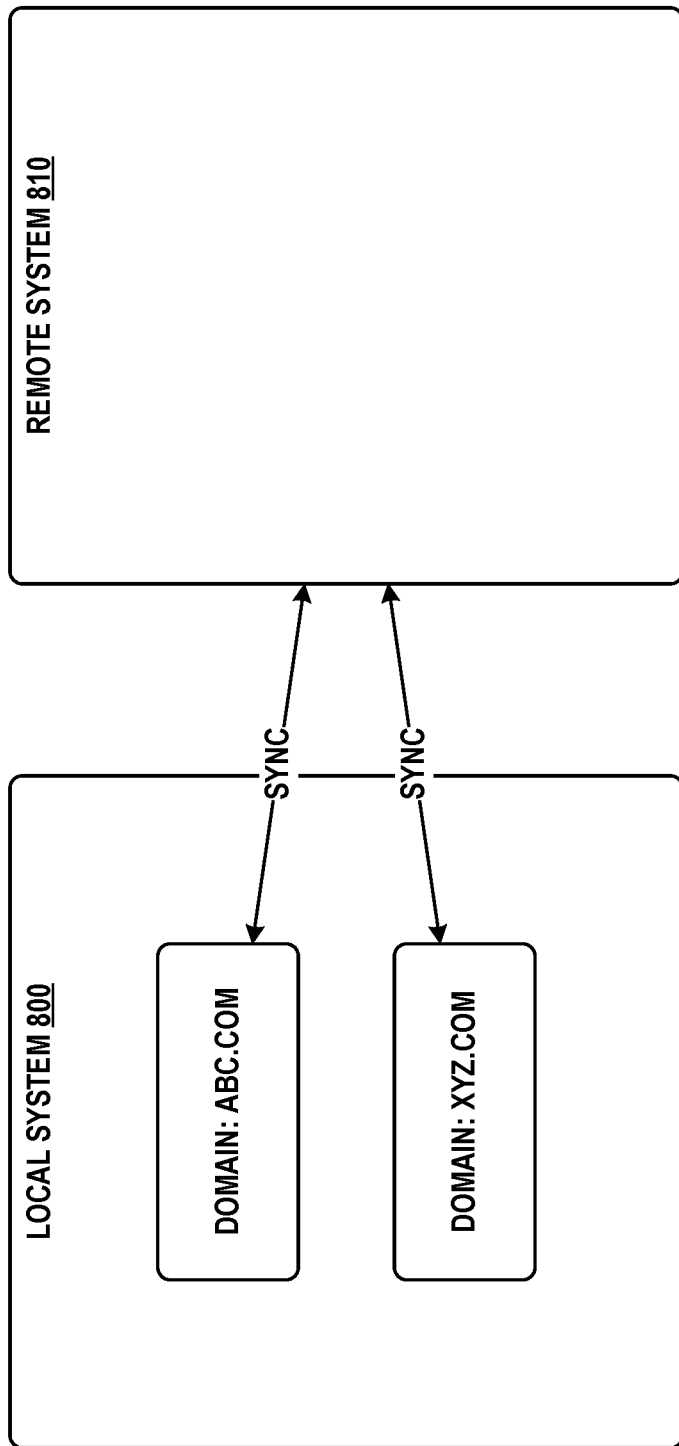
FIG. 12 depicts domain separation, in accordance with example embodiments.

This architecture is shown in FIG. 12. Local system 800 hosts services for domain abc.com and domain xyz.com. Both of these domains may synchronize their database entries with remote system 810.

As a concrete example, local system 800 may provide purchasing application services to domain abc.com and domain xyz.com. These purchasing services may facilitate the purchasing of mobile phone services for employees of domain abc.com and domain xyz.com. Thus, local system 800 may include database tables indicating the current equipment and service agreement of each relevant employee. Further, remote system 810 may be the mobile phone service provider and therefore also contain representation of the entries in these tables.

Clearly, it is desirable to keep the equipment and service agreement data synchronized between local system 800 and remote system 810. But this should be done in a manner that does not allow information to "leak" between domain abc.com and domain xyz.com.

In order to facilitate these integrity and security concerns a number of the feature described above occur on a per-domain basis. To that point, synchronization configuration data stored in files or database tables, triggers, outbound queues, inbound queues, outbound flow processing, and inbound flow processing are domain-separated. This means that each of these items may be stored in separate domain-specific tables or be executed in a domain-specific context. Further, each domain may have its own unique system identifier that can be used to disambiguate communication between the local system and remote system.

As an example of the latter, each of domain abc.com and domain xyz.com may be associated with a unique sys_domain value that is included in or associated with all relevant files and database entries. For outbound queues, messages are stored with the same sys_domain value as the associated database entry. For inbound queues, messages are stored with the same sys_domain as the local inbound API user invoked by the remote system. Likewise, outbound flows and inbound flows are executed in the same sys_domain as each individual queued message.

In some embodiments, the local system may support a hierarchy of domains, (e.g., with abc.com being a parent domain and one.abc.com and two.abc.com being child domains of abc.com). In these cases, the configurations for the child domains may be in the same domain as the configurations for the parent domain. In a child domain, inbound and outbound flows may be chosen from the child domain, from its parent domain, or from a global domain. In a parent domain, runtime changes to database entries in a child domain can be captured and processed in the parent domain.

VI. Example Operations

Figure 13:
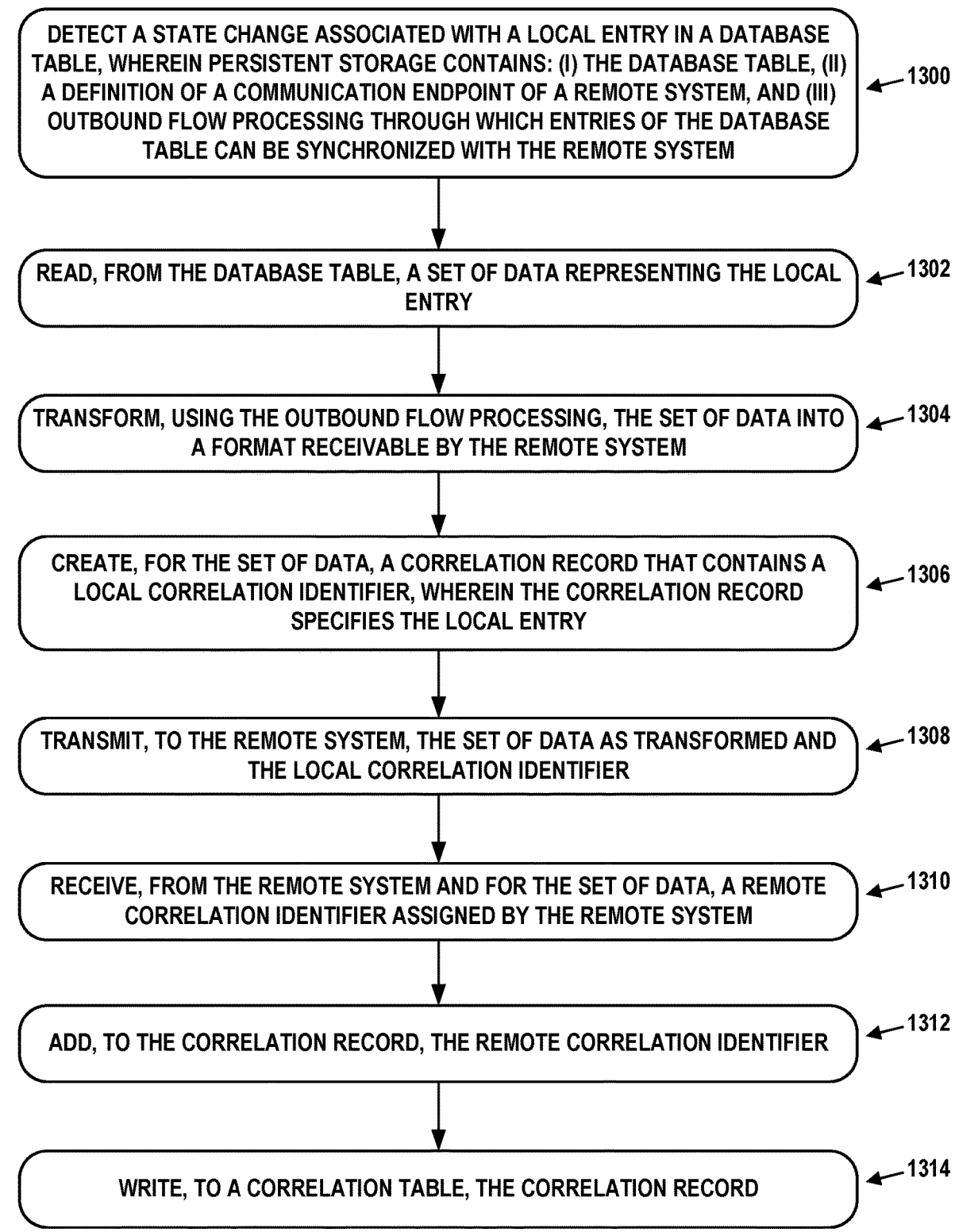
FIG. 13 is a flow chart, in accordance with example embodiments.

FIG. 13 is a flow chart illustrating an example embodiment. The process illustrated by FIG. 13 may be carried out by a computing device, such as computing device 100, and/or a cluster of computing devices, such as server cluster 200. However, the process can be carried out by other types of devices or device subsystems. For example, the process could be carried out by a computational instance of a remote network management platform.

The embodiments of FIG. 13 may be simplified by the removal of any one or more of the features shown therein. Further, these embodiments may be combined with features, aspects, and/or implementations of any of the previous figures or otherwise described herein.

Block 1300 may involve detecting a state change associated with a local entry in a database table, wherein persistent storage contains: (i) the database table, (ii) a definition of a communication endpoint of a remote system, and (iii) outbound flow processing through which entries of the database table can be synchronized with the remote system.

Block 1302 may involve reading, from the database table, a set of data representing the local entry.

Block 1304 may involve transforming, using the outbound flow processing, the set of data into a format receivable by the remote system.

Block 1306 may involve creating, for the set of data, a correlation record that contains a local correlation identifier, wherein the correlation record specifies the local entry.

Block 1308 may involve transmitting, to the remote system, the set of data as transformed and the local correlation identifier. If an associated remote correlation identifier is present or known, it may be included in this transmission as well.

Block 1310 may involve receiving, from the remote system and for the set of data, a remote correlation identifier assigned by the remote system.

Block 1312 may involve adding, to the correlation record, the remote correlation identifier.

Block 1314 may involve writing, to a correlation table, the correlation record.

As noted previously, the local correlation identifier (LCD) and the remote correlation identifier (RCID) are relative to whether the system in question is the local system or the remote system. Put another way, a value for an LCID on the local system will be an RCID on the remote system, and a value for an RCID on the local system will be an LCID on the remote system.

In some embodiments, reading the set of data representing the local entry comprises placing the set of data read from the database table into an outbound queue, wherein transforming the set of data comprises the outbound flow processing reading the set of data from the outbound queue, wherein the outbound queue operates in a first-in-first-out manner, and wherein a scheduled job processes contents of the outbound queue with a duty cycle of m seconds every m+n seconds.

Some embodiments may involve: detecting a further state change associated with the local entry in the database table; reading, from the database table, a further set of data representing the local entry; transforming the further set of data into the format receivable by the remote system; reading, from the correlation table, the correlation record; and possibly based on the correlation record, transmitting, to the remote system, the further set of data as transformed with at least one of the local correlation identifier or the remote correlation identifier.

Some embodiments may involve: receiving, from the remote system, a second remote correlation identifier for the further set of data; and writing, to the correlation table, a second correlation record containing the local correlation identifier and the second remote correlation identifier.

In some embodiments, the persistent storage also contains definitions of an inbound API and inbound flow processing through which the entries can be synchronized with the remote system. These embodiments may involve: receiving, from the remote system and by way of the inbound API, an additional set of data with an additional remote correlation identifier assigned by the remote system; transforming, using the inbound flow processing, the additional set of data into a format storable in the database table; creating, for the additional set of data, an additional correlation record that contains an additional local correlation identifier and the additional remote correlation identifier, wherein the additional correlation record specifies an additional local entry in the database table; writing, to the correlation table, the additional correlation record; and writing, to the database table and as the additional local entry, the additional set of data as transformed.

These embodiments may also involve: receiving, from the remote system and by way of the inbound API, a second additional set of data with the additional remote correlation identifier; transforming, using the inbound flow processing, the second additional set of data into the format storable in the database table; reading, from the correlation table, the additional correlation record; and possibly based on the additional correlation record, writing, to the database table and as the additional local entry, the second additional set of data.

In some embodiments, receiving the additional set of data comprises placing the additional set of data into an inbound queue, wherein transforming the additional set of data comprises the inbound flow processing reading the additional set of data from the inbound queue, wherein the inbound queue operates in a first-in-first-out manner, and wherein a scheduled job processes contents of the inbound queue with a duty cycle of m seconds every m+n seconds.

In some embodiments, the local entry is associated with an attachment stored as a file. These embodiments may involve: possibly based on the local entry being associated with the attachment, transmitting, to the remote system, metadata for the attachment, wherein the metadata includes at least a filename of the attachment and a key; receiving, from the remote system, a request for the attachment and the key; and possibly based on receiving the request for the attachment and the key, transmitting, to the remote system, the attachment.

In some embodiments, the definition of the communication endpoint of the remote system includes one or more of: an IP address of the remote system, a domain name of the remote system, a REST interface of the remote system, or an inbound API user of the remote system. In these embodiments, transmitting the set of data as transformed and the local correlation identifier may involve transmitting the set of data and credentials of the inbound API user.

In some embodiments, the local entry is associated with a domain, wherein the outbound flow processing is configured to operate on the entries associated with the domain, and wherein transmitting the set of data as transformed comprises transmitting an indication of the domain with the set of data as transformed.

In some embodiments, errors due to transforming the set of data into the format receivable by the remote system are flagged for manual review, wherein errors due to transmitting the set of data are flagged for one or more automatic retries.

In some embodiments, the state change is a change to the local entry.

Figure 14:
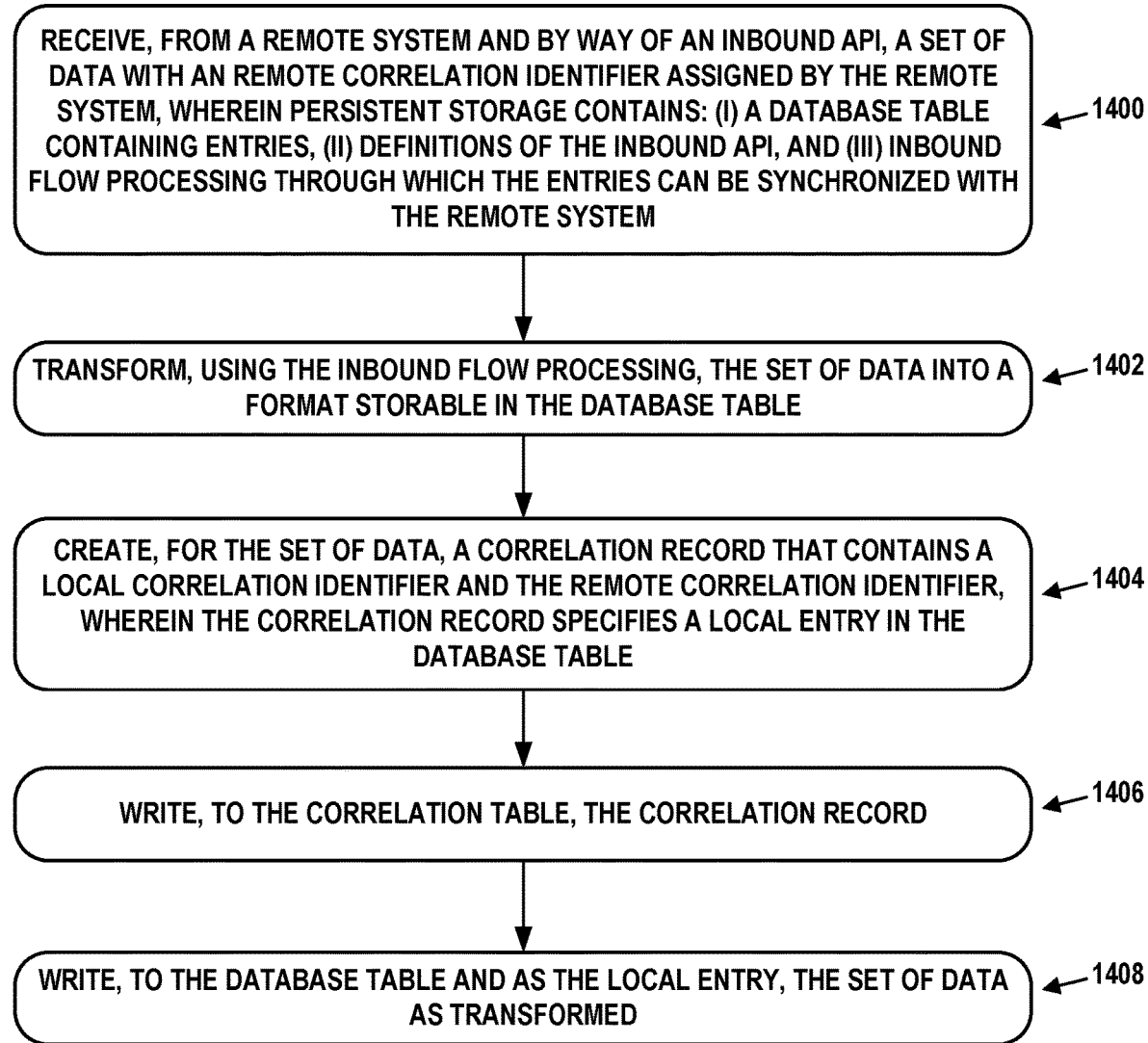
FIG. 14 is a flow chart, in accordance with example embodiments.

FIG. 14 is a flow chart illustrating an example embodiment. The process illustrated by FIG. 14 may be carried out by a computing device, such as computing device 100, and/or a cluster of computing devices, such as server cluster 200. However, the process can be carried out by other types of devices or device subsystems. For example, the process could be carried out by a computational instance of a remote network management platform.

The embodiments of FIG. 14 may be simplified by the removal of any one or more of the features shown therein. Further, these embodiments may be combined with features, aspects, and/or implementations of any of the previous figures or otherwise described herein. Notably, the features of FIG. 14 may be combined with any feature described in the context of FIG. 13, for instance.

Block 1400 may involve receiving, from a remote system and by way of an inbound API, a set of data with a remote correlation identifier assigned by the remote system, wherein persistent storage contains: (i) a database table containing entries, (ii) definitions of the inbound API, and (iii) inbound flow processing through which the entries can be synchronized with the remote system. In some cases, a local correlation identifier may be received as well.

Block 1402 may involve transforming, using the inbound flow processing, the set of data into a format storable in the database table.

Block 1404 may involve creating, for the set of data, a correlation record that contains a local correlation identifier and the remote correlation identifier, wherein the correlation record specifies a local entry in the database table.

Block 1406 may involve writing, to the correlation table, the correlation record.

Block 1408 may involve writing, to the database table and as the local entry, the set of data as transformed.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, solid-state drives, or compact disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing: (i) a database table containing entries, (ii) a definition of a communication endpoint of a remote system, and (iii) outbound flow processing through which the entries can be synchronized with the remote system; and
   one or more processors configured to:
      detect a state change associated with a local entry in the database table;
      read, from the database table, a set of data representing the local entry;
      transform, using the outbound flow processing, the set of data into a format receivable by the remote system;
      create, for the set of data, a correlation record that contains a local correlation identifier assigned by the system, wherein the correlation record specifies the local entry;
      transmit, to the remote system, the set of data as transformed and the local correlation identifier;
      receive, from the remote system and for the set of data, a remote correlation identifier assigned by the remote system;
      add, to the correlation record, the remote correlation identifier; and
      write, to a correlation table, the correlation record.

2. The system of claim 1, wherein reading the set of data representing the local entry comprises placing the set of data read from the database table into an outbound queue, wherein transforming the set of data comprises the outbound flow processing reading the set of data from the outbound queue, wherein the outbound queue operates in a first-in-first-out manner, and wherein a scheduled job processes contents of the outbound queue with a duty cycle of m seconds every m+n seconds.

3. The system of claim 1, wherein the one or more processors are further configured to:
   detect a further state change associated with the local entry in the database table;
   read, from the database table, a further set of data representing the local entry;
   transform the further set of data into the format receivable by the remote system;
   read, from the correlation table, the correlation record; and
   based on the correlation record, transmit, to the remote system, the further set of data as transformed with at least one of the local correlation identifier or the remote correlation identifier.

4. The system of claim 3, wherein the one or more processors are further configured to:
   receive, from the remote system, a second remote correlation identifier for the further set of data; and
   write, to the correlation table, a second correlation record containing the local correlation identifier and the second remote correlation identifier.

5. The system of claim 1, wherein the persistent storage also contains definitions of an inbound application programming interface (API) and inbound flow processing through which the entries can be synchronized with the remote system, and wherein the one or more processors are further configured to:

receive, from the remote system and by way of the inbound API, an additional set of data with an additional remote correlation identifier assigned by the remote system;

transform, using the inbound flow processing, the additional set of data into a format storable by the system;

create, for the additional set of data, an additional correlation record that contains an additional local correlation identifier assigned by the system and the additional remote correlation identifier, wherein the additional correlation record specifies an additional local entry in the database table;

write, to the correlation table, the additional correlation record; and write, to the database table and as the additional local entry, the additional set of data as transformed.

6. The system of claim 5, wherein the one or more processors are further configured to:

receive, from the remote system and by way of the inbound API, a second additional set of data with the additional remote correlation identifier;

transform, using the inbound flow processing, the second additional set of data into the format storable by the system;

read, from the correlation table, the additional correlation record; and based on the additional correlation record, write, to the database table and as the additional local entry, the second additional set of data.

7. The system of claim 5, wherein receiving the additional set of data comprises placing the additional set of data into an inbound queue, wherein transforming the additional set of data comprises the inbound flow processing reading the additional set of data from the inbound queue, wherein the inbound queue operates in a first-in-first-out manner, and wherein a scheduled job processes contents of the inbound queue with a duty cycle of m seconds every m+n seconds.

8. The system of claim 1, wherein the local entry is associated with an attachment stored as a file within the system, and wherein the one or more processors are further configured to:

based on the local entry being associated with the attachment, transmit, to the remote system, metadata for the attachment, wherein the metadata includes at least a filename of the attachment and a key;

receive, from the remote system, a request for the attachment and the key; and based on receiving the request for the attachment and the key, transmit, to the remote system, the attachment.

9. The system of claim 1, wherein the definition of the communication endpoint of the remote system includes one or more of: an Internet Protocol (IP) address of the remote system, a domain name of the remote system, a representational state transfer (REST) interface of the remote system, or an inbound application programming interface (API) user of the remote system.

10. The system of claim 9, wherein transmitting the set of data as transformed and the local correlation identifier comprises transmitting the set of data and credentials of the inbound API user.

11. The system of claim 1, wherein the local entry is associated with a domain configured on the system, wherein the outbound flow processing is configured to operate on the entries associated with the domain, and wherein transmitting the set of data as transformed comprises transmitting an indication of the domain with the set of data as transformed.

12. The system of claim 1, wherein errors due to transforming the set of data into the format receivable by the remote system are flagged for manual review, and wherein errors due to transmitting the set of data are flagged for one or more automatic retries.

13. The system of claim 1, wherein the state change is a change to the local entry.

14. A computer-implemented method comprising:

detecting a state change associated with a local entry in a database table, wherein persistent storage contains: (i) the database table, (ii) a definition of a communication endpoint of a remote system, and (iii) outbound flow processing through which entries of the database table can be synchronized with the remote system;

reading, from the database table, a set of data representing the local entry;

transforming, using the outbound flow processing, the set of data into a format receivable by the remote system;

creating, for the set of data, a correlation record that contains a local correlation identifier, wherein the correlation record specifies the local entry;

transmitting, to the remote system, the set of data as transformed and the local correlation identifier;

receiving, from the remote system and for the set of data, a remote correlation identifier assigned by the remote system;

adding, to the correlation record, the remote correlation identifier; and writing, to a correlation table, the correlation record.

15. The computer-implemented method of claim 14, wherein reading the set of data representing the local entry comprises placing the set of data read from the database table into an outbound queue, wherein transforming the set of data comprises the outbound flow processing reading the set of data from the outbound queue, wherein the outbound queue operates in a first-in-first-out manner, and wherein a scheduled job processes contents of the outbound queue with a duty cycle of m seconds every m+n seconds.

16. The computer-implemented method of claim 14, further comprising:

detecting a further state change associated with the local entry in the database table;

reading, from the database table, a further set of data representing the local entry;

transforming the further set of data into the format receivable by the remote system;

reading, from the correlation table, the correlation record; and based on the correlation record, transmitting, to the remote system, the further set of data as transformed with at least one of the local correlation identifier or the remote correlation identifier.

17. The computer-implemented method of claim 14, wherein the persistent storage also contains definitions of an inbound application programming interface (API) and inbound flow processing through which the entries can be synchronized with the remote system, the computer-implemented method further comprising:

receiving, from the remote system and by way of the inbound API, an additional set of data with an additional remote correlation identifier assigned by the remote system;

transforming, using the inbound flow processing, the additional set of data into a format storable in the database table;

creating, for the additional set of data, an additional correlation record that contains an additional local correlation identifier and the additional remote correlation identifier, wherein the additional correlation record specifies an additional local entry in the database table;

writing, to the correlation table, the additional correlation record; and writing, to the database table and as the additional local entry, the additional set of data as transformed.

18. The computer-implemented method of claim 14, wherein the local entry is associated with an attachment stored as a file, the computer-implemented method further comprising:

based on the local entry being associated with the attachment, transmitting, to the remote system, metadata for the attachment, wherein the metadata includes at least a filename of the attachment and a key;

receiving, from the remote system, a request for the attachment and the key; and based on receiving the request for the attachment and the key, transmitting, to the remote system, the attachment.

19. The computer-implemented method of claim 14, wherein errors due to transforming the set of data into the format receivable by the remote system are flagged for manual review, and wherein errors due to transmitting the set of data are flagged for one or more automatic retries.

20. An article of manufacture including a non-transitory computer-readable medium, having stored thereon program instructions that, upon execution by a computing system, cause the computing system to perform operations comprising:

detecting a state change associated with a local entry in a database table, wherein persistent storage contains: (i) the database table, (ii) a definition of a communication endpoint of a remote system, and (iii) outbound flow processing through which entries of the database table can be synchronized with the remote system;

reading, from the database table, a set of data representing the local entry;

transforming, using the outbound flow processing, the set of data into a format receivable by the remote system;

creating, for the set of data, a correlation record that contains a local correlation identifier, wherein the correlation record specifies the local entry;

transmitting, to the remote system, the set of data as transformed and the local correlation identifier;

receiving, from the remote system and for the set of data, a remote correlation identifier assigned by the remote system;

adding, to the correlation record, the remote correlation identifier; and writing, to a correlation table, the correlation record.

* * * * *